United States Patent
Tilley et al.

(10) Patent No.: US 9,330,821 B2
(45) Date of Patent: May 3, 2016

(54) MAGNETIC NANOPARTICLES

(75) Inventors: Richard David Tilley, Wellington (NZ);
Soshan Cheong, Wellington (NZ);
Jintian Ren, Fuzhou (CN)

(73) Assignee: BOUTIQ SCIENCE LIMITED, Wellington (NZ)

(*) Notice: Subject to any disclaimer, the term of this patent is extended or adjusted under 35 U.S.C. 154(b) by 1138 days.

(21) Appl. No.: 13/140,935

(22) PCT Filed: Dec. 21, 2009

(86) PCT No.: PCT/NZ2009/000297
§ 371 (c)(1),
(2), (4) Date: Sep. 8, 2011

(87) PCT Pub. No.: WO2010/071459
PCT Pub. Date: Jun. 24, 2010

(65) Prior Publication Data
US 2012/0012778 A1    Jan. 19, 2012

(30) Foreign Application Priority Data

Dec. 19, 2008   (NZ) .......................... 573797

(51) Int. Cl.
*C01G 49/00* (2006.01)
*B22F 9/24* (2006.01)
(Continued)

(52) U.S. Cl.
CPC . *H01F 1/09* (2013.01); *B82Y 25/00* (2013.01); *B82Y 30/00* (2013.01); *C01B 21/0622* (2013.01); *C01B 31/303* (2013.01); *C01G 49/06* (2013.01);
(Continued)

(58) Field of Classification Search
CPC .............. B22F 9/22; B22F 9/24; B22F 9/26; B22F 9/30; H01F 1/09; H01F 1/33
USPC ........................ 75/348; 148/287; 252/62.56
See application file for complete search history.

(56) References Cited

U.S. PATENT DOCUMENTS

| 4,501,726 A | 2/1985 | Schroder et al. |
| 5,549,973 A | 8/1996 | Majetich et al. |

(Continued)

FOREIGN PATENT DOCUMENTS

| EP | 1952919 | 8/2008 |
| WO | 03031323 | 4/2003 |

(Continued)

OTHER PUBLICATIONS

Hikaru Aoshima et al., Preparation and Characterization of Fe—N Nanoparticles by Gas Flow Sputtering, JP Journal of Applied Physics, vol. 47, No. 1, (2008) pp. 780-783.

(Continued)

*Primary Examiner* — Matthew E Hoban
(74) *Attorney, Agent, or Firm* — Dann, Dorfman, Herrell and Skillman, P.C.

(57) ABSTRACT

Methods for preparing magnetic nanoparticles comprising metal, metal carbide, metal nitride, metal sulfide, metal phosphide, metal oxide or a mixture thereof are disclosed. Methods for preparing magnetic nanoparticles having a core comprising metal, metal carbide, metal nitride, metal sulfide, metal phosphide, or a mixture thereof and a metal oxide shell are also disclosed. The methods comprise the solution-phase decomposition of a precursor at elevated temperature then exposure of the reaction mixture to an oxidizing medium, such as air.

19 Claims, 8 Drawing Sheets

(51) Int. Cl.

| | | |
|---|---|---|
| *B22F 9/26* | (2006.01) | |
| *B22F 9/30* | (2006.01) | |
| *H01F 1/09* | (2006.01) | |
| *H01F 1/33* | (2006.01) | |
| *B82Y 25/00* | (2011.01) | |
| *B82Y 30/00* | (2011.01) | |
| *C01B 21/06* | (2006.01) | |
| *C01B 31/30* | (2006.01) | |
| *C01G 49/06* | (2006.01) | |
| *C01G 49/08* | (2006.01) | |
| *H01F 1/00* | (2006.01) | |

(52) U.S. Cl.
CPC ............... *C01G 49/08* (2013.01); *H01F 1/0054* (2013.01); *C01P 2002/72* (2013.01); *C01P 2004/03* (2013.01); *C01P 2004/04* (2013.01); *C01P 2004/64* (2013.01); *C01P 2006/40* (2013.01); *C01P 2006/42* (2013.01); *H01F 1/33* (2013.01)

(56) References Cited

U.S. PATENT DOCUMENTS

| | | | |
|---|---|---|---|
| 5,783,263 | A | 7/1998 | Majetich et al. |
| 6,254,662 | B1 | 7/2001 | Murray et al. |
| 6,262,129 | B1 | 7/2001 | Murray et al. |
| 6,395,053 | B1 | 5/2002 | Fau et al. |
| 6,972,046 | B2 | 12/2005 | Sun et al. |
| 6,987,302 | B1 | 1/2006 | Chen et al. |
| 7,407,527 | B2 * | 8/2008 | Hyeon .......................... 75/351 |
| 8,236,284 | B1 | 8/2012 | Perez et al. |
| 2003/0028071 | A1 | 2/2003 | Handy et al. |
| 2003/0032995 | A1 | 2/2003 | Handy et al. |
| 2004/0022374 | A1 | 2/2004 | Bonitatebus, Jr. et al. |
| 2004/0115124 | A1 | 6/2004 | Woo et al. |
| 2005/0036938 | A1 | 2/2005 | Hyeon |
| 2005/0271745 | A1 | 12/2005 | Gruettner et al. |
| 2006/0110313 | A1 | 5/2006 | Cho et al. |
| 2006/0142749 | A1 | 6/2006 | Ivkov |
| 2006/0163526 | A1 | 7/2006 | Teller et al. |
| 2006/0283290 | A1 | 12/2006 | Hattori et al. |
| 2007/0036728 | A1 | 2/2007 | Mohapatra et al. |
| 2007/0056401 | A1 | 3/2007 | Sun |
| 2007/0264492 | A1 | 11/2007 | Mizuno et al. |
| 2008/0003159 | A1 | 1/2008 | Cheon et al. |
| 2008/0168863 | A1 | 7/2008 | Sun et al. |
| 2008/0241054 | A1 | 10/2008 | Li et al. |
| 2008/0299631 | A1 | 12/2008 | Peng et al. |
| 2009/0184282 | A1 | 7/2009 | Carpenter et al. |
| 2010/0008854 | A1 | 1/2010 | Haam et al. |
| 2010/0047180 | A1 | 2/2010 | Zeng et al. |
| 2010/0047578 | A1 | 2/2010 | Lee |
| 2011/0053174 | A1 | 3/2011 | Josephson et al. |
| 2011/0098558 | A1 | 4/2011 | Weaver et al. |
| 2011/0098623 | A1 | 4/2011 | Zhang et al. |
| 2011/0104073 | A1 | 5/2011 | Zeng et al. |
| 2011/0130616 | A1 | 6/2011 | Seeney et al. |
| 2011/0135729 | A1 | 6/2011 | Cheon et al. |
| 2011/0151429 | A1 | 6/2011 | Haam et al. |
| 2011/0177153 | A1 | 7/2011 | Zhu |
| 2011/0217727 | A1 | 9/2011 | Kim |
| 2011/0250146 | A1 | 10/2011 | Zhang et al. |
| 2012/0004531 | A1 | 1/2012 | Medarova et al. |
| 2012/0043495 | A1 | 2/2012 | Gangopadhyay et al. |
| 2012/0052286 | A1 | 3/2012 | Norwood et al. |
| 2012/0145601 | A1 | 6/2012 | Lee |
| 2012/0329129 | A1 | 12/2012 | Chang et al. |
| 2013/0137114 | A1 | 5/2013 | Haam et al. |

FOREIGN PATENT DOCUMENTS

| | | |
|---|---|---|
| WO | 03062372 | 7/2003 |
| WO | 03071561 | 8/2003 |
| WO | 03086660 | 10/2003 |
| WO | 2004060580 | 7/2004 |
| WO | 2006052042 | 5/2006 |
| WO | 2006057467 | 6/2006 |
| WO | 2006137895 | 12/2006 |
| WO | 2007075886 | 7/2007 |
| WO | 2008030110 | 3/2008 |

OTHER PUBLICATIONS

Didier Astruc, Organo-Iron Complexes of Aromatic Compounds, Applications in Synthesis, TetraHedron, vol. 39, No. 24, (1983) pp. 4027-4095.

Catherine C. Berry, Possible exploitation of magnetic nanoparticle-cell interaction for biomedical applications, Journal of Materials for Chemistry, 15, (2005) pp. 543-547.

Everett E. Carpenter, Iron nanoparticles as potential magnetic carriers, Journal of Magnetism and Magnetic Materials, 225, (2001) pp. 17-20.

Nadege Cordente et al., Synthesis and Magnetic Properties of Nickel Nanorods, Nano Letters, vol. 1, No. 10, (2001), pp. 565-568.

Frederic Dumestre et al., Superlattices of Iron Nanocubes Synthesized from Fe [N(SiMe3)2]2, Science, vol. 303. Feb. 6, 2004, pp. 821-823.

Dorothy Farrell et al., Preparation and Characterization of Monodisperse Fe Nanoparticles, J. Phys. Chem. B, 107, (2003) pp. 11022-11030.

Junfeng Geng et al., Direct conversion of iron stearate into magnetic Fe and Fe3C nanocrystals encapsulated in polyhedral graphite cages, Chem. Comun., (2004) pp. 2442-2443.

M.L.H. Green et al., Spectroscopic Studies of Some Organoiron Complexes, J. Chem. Soc., (1960) pp. 989-997.

Ajay Kumar Gupta et al., Recent advances on surface engineering of magnetic iron oxide nanoparticles and their biomedical applications, Nanomedicine, (2007) 2, pp. 23-39.

Yi Han et al., Low-Temperature Approach to Synthesize Iron Nitride from Amorphous Iron, Inorganic Chemistry, vol. 47, No. 4, (2008) pp. 1261-1263.

V.D. Blank et al., Transmission electron microscopy studies of nanofibers formed on Fe7C3-carbide, Diamond and Related Materials 11 (2002), pp. 931-934.

Wei Huang et al., Study on the synthesis of epsilon-Fe3N-based magnetic fluid, Journal of Magnetism and Magnetic Materials 307 (2006), pp. 198-204.

C. Alexiou et al., Medical Applications of Magnetic Nanoparticles, Journal of Nanoscience and Nanotechnology, vol. 6, (2006) pp. 2762-2768.

Jriuan Lai et al., One-Step Synthesis of Core(Cr)/Shell(gamma-Fe2O3) Nanoparticles, J. Am. Chem. Soc., 127, (2005) pp. 5730-5731.

D. Li et al., Characterization of Fe/N nanoparticles synthesized by the chemical vapor condensation process, Journal of Magnetism and Magnetic Material, 277, (2004) pp. 64-70.

Zhen Li et al., One-Pot Reaction to Synthesize Biocompatible Magnetite Nanoparticles, Advanced Materials, 17, No. 8, Apr. 18, 2005, pp. 1001-1005.

O. Margeat, Synthesis of iron nanoparticles: Size effects, shape control and organisation, Progress in Solid State Chemistry 33, (2005) pp. 71-79.

Sergei I. Nikitenko et al., Synthesis of Highly Magnetic, Air-Stable Iron—Iron Carbide Nanocrystalline Particles by Using Power Ultrasound, Angew. Chem. Int. Ed. 40, No. 23, (2001) pp. 4447-4449.

Sang-Jae Park et al., Synthesis and Magnetic Studies of Uniform Iron Nanorods and Nanospheres, J. Am. Chem. Soc.122, (2000) pp. 8581-8582.

Sheng Peng et al., Synthesis and Stabilization of Monodisperse Fe Nanoparticles, J. Am. Chem. Soc. 128, (2006) pp. 10676-10677.

Huiping Shao et al., Control of Iron Nanoparticles Size and Shape by Thermal Decomposition Method, IEEE Transactions on Magnetics, vol. 41, No. 10, Oct. 2005, pp. 3388-3390.

(56) References Cited

OTHER PUBLICATIONS

Shouheng Sun et al., Synthesis of monodisperse cobalt nanocrystals and their assembly into magnetic superlattices (invited), Journal of Applied Physics, vol. 85, No. 8, Apr. 15, 1999, pp. 4325-4330.
Shouheng Sun et al., Science 287, (2000) pp. 1989-1992.
Kenneth S. Suslick et al., Sonochemical Synthesis of Iron Colloids, J. Am. Chem. Soc. 118, (1996) pp. 11960-11961.
S. Yu et al., Synthesis, structural, magnetic, and cytotoxic properties of iron oxide coated iron/iron-carbide nanocomposite particles, Journal of Applied Physics 98, 114306, (2005) pp. 114306-1 to 114306-7.
X.Q. Zhao et al., Growth of gamma prime-Fe4N and gamma-Fe ultrafine powders synthesized by laser-induced pyrolysis of mixtures of Fe(CO)5 and NH3, Materials Letters 23, (1995) pp. 305-308.
Wei Huang et al., Preparation and magnetic properties of nanoscale epsilon-Fe3N Particles, Journal of Alloys and Compounds 443, (2007) pp. 48-52.
PCT/NZ2007/000246, Written Opinion of the International Searching Authority, Apr. 11, 2008, pp. 1-7.
PCT/NZ2009/000297, Written Opinion of the International Searching Authority, Mar. 8, 2010.
R. Matthew Ferguson et al., "Optimization of nanoparticle core size for magnetic particle imaging," Journal of Magnetism and Magnetic Materials, 321 (2009), pp. 1548-1551.
Bernhard Gleich et al., "Tomographic imaging using the nonlinear response of magnetic particles," Nature vol. 435, No. 30, Jun. 2005, pp. 1214-1217.
J. Weizenecker et al., "Three-dimensional real-time in vivo magnetic particle imaging," Physics in Medicine and Biology 54 (2009), pp. L1-L10.
Jeff W.M. Bulte, "In Vivo MRI Cell Tracking: Clinical Studies," AJR 193, Aug. 2009, pp. 314-325.
Wei Liu et al., "In vivo MRI using positive-contrast techniques in detection of cells labeled with superparamagnetic iron oxide nanoparticles," NMR Biomed. 2008, 21, pp. 242-250.

\* cited by examiner

MAGNETIC NANOPARTICLES

TECHNICAL FIELD

The present invention relates to methods for preparing magnetic nanoparticles and to nanoparticles produced by those methods. More particularly, the invention relates to methods for preparing nanoparticles comprising metal, metal carbide, metal nitride, metal sulfide, metal phosphide, metal oxide or a mixture thereof. The invention also relates to methods for preparing nanoparticles having a core comprising metal, metal carbide, metal nitride, metal sulfide, metal phosphide, or a mixture thereof and a metal oxide shell.

BACKGROUND ART

WO 03/71561 describes the preparation of magnetic nanoparticles by decomposition of a cobalt precursor at an elevated temperature and pressure in a $H_2$ atmosphere. Iron nanoparticles have been synthesised using the same method by decomposing $Fe[N(SiMe_3)_2]_2$ (see Margeat, O. et al. *Prog. Solid State Chem.* 2005, 33, 71). The iron nanoparticles are highly air-sensitive, resulting in an iron/iron oxide core/shell structure.

Shao et al. also report the air-sensitivity of iron nanoparticles, and oxidised amorphous iron nanoparticles at the surface to give a crystalline $Fe_3O_4$ shell (*IEEE Trans. Magn.* 2005, 41, 3388). Peng et al. (*J. Am. Chem. Soc.* 2006, 128, 10676) modified this method by introducing a controlled oxidation of iron nanoparticles, which were prepared from $Fe(CO)_5$ using a similar method to that described by Shao et al.

WO 03/86660 describes the preparation of metal/metal oxide core/shell structures in which the shell is deliberately formed in a sequential reverse micelle synthesis. This method involves multiple steps and the use of a reducing agent. Lai et al. report a one-step synthesis to produce $Cr/Fe_2O_3$ core/shell nanoparticles by thermal decomposition of the respective metal carbonyl precursors (*J. Am. Chem. Soc.* 2005, 127, 5730).

WO 2004/060580 describes another form of core/shell nanoparticle comprising a (transition) metal core with a noble metal shell, which is prepared with methods involving multiple and sequential steps. Such nanoparticles are also described by Carpenter (*J. Magn. Magn. Mater.* 2001, 225, 17).

The mixing of iron and carbon to make steel has been studied for centuries. Iron carbides form in several different stoichiometries. $Fe_3C$ is the most stable and two others exist based around this structure, $Fe_7C_3$ and $Fe_5C_2$.

Bulk carbides are generally produced by heating the metal and carbon to very high temperatures, typically above 1000° C. Nanoparticles of iron carbide have mainly been formed in experiments in furnaces operated at 500-700° C. Other methods involve high energy techniques, including laser ablation.

Solution syntheses are typically cheaper, more energy effective and enable scale up. In addition, such syntheses may provide some control of the shape of the nanoparticles formed. Yu and Chow describe a solution phase synthesis of iron-iron carbide nanocomposite/iron oxide core/shell particles from iron pentacarbonyl in diphenyl ether at 257° C. under an argon, methane or acetylene atmosphere (*Journal of Applied Physics* 2005, 98, 114306). The results of this work show that, without a source of carbon in addition to the iron pentacarbonyl, the amount of carbide formed is less than about 5%.

Iron nitride exists in many different phases. Those most frequently reported in the literature are $\gamma'$-$Fe_4N$, $\epsilon$-$Fe_3N$ and $\alpha''$-$Fe_{16}N_2$.

In steel making, nitriding leads to the formation of nitrides of iron and other elements. The process is similar to that of carburisation, but at a relatively lower temperature. The synthesis of iron nitride nanoparticles usually involves heating an iron precursor in flowing ammonia gas. These syntheses are generally physical methods operating at temperatures in the range of 300-1000° C. (see Li et al. *J. Magn. Magn. Mater.* 2004, 277, 641).

In recent reports, Huang and co-workers (*J. Magn. Magn. Mater.* 2006, 307, 198) describe the preparation of 12-18 nm $\epsilon$-$Fe_3N$ nanoparticles by passing a mixture of $Fe(CO)_5$ vapour and ammonia gas through a carrier liquid containing surfactant molecules at 180° C. This temperature is much lower than those employed in the conventional methods. The nanoparticles oxidise on the surface to give $\epsilon$-$Fe_3N/Fe_2O_3$ core/shell structures.

It is an object of the present invention to provide an improved method for preparing magnetic nanoparticles; and/or to go some way to avoiding the above disadvantages; and/or to at least provide the public with a useful choice.

Other objects of the invention may become apparent from the following description which is given by way of example only.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date.

SUMMARY OF THE INVENTION

In a first aspect, the present invention provides a method for preparing magnetic nanoparticles, the method comprising:
(a) preparing a solution of a precursor comprising at least one metal compound in a liquid reaction medium;
(b) heating the solution to a first temperature and maintaining the first temperature for a first period of time to at least partially decompose the precursor;
(c) optionally, heating or cooling the reaction mixture from step (b) to a second temperature and maintaining the second temperature for a second period of time to further decompose the precursor;
(d) exposing the reaction mixture to an oxidising medium; and
(e) recovering the resulting nanoparticles.

In a further aspect, the present invention provides a method for preparing magnetic nanoparticles having a core comprising metal, metal carbide, metal nitride, metal sulfide, metal phosphide, or a mixture thereof and a metal oxide shell, the method comprising:
(a) preparing a solution of a precursor comprising at least one metal compound in a liquid reaction medium;
(b) heating the solution to a first temperature and maintaining the first temperature for a first period of time to at least partially decompose the precursor;
(c) optionally, heating or cooling the reaction mixture from step (b) to a second temperature and maintaining the second temperature for a second period of time to further decompose the precursor;
(d) exposing the reaction mixture to an oxidising medium; and
(e) recovering the resulting nanoparticles.

In another aspect, the present invention provides magnetic nanoparticles when prepared by a method of the invention.

In another aspect, the present invention provides a method of magnetic bioseparation using magnetic nanoparticles of the invention. The invention also provides a use of magnetic nanoparticles of the invention for magnetic bioseparation. The invention also provides magnetic nanoparticles of the invention for use in magnetic bioseparation.

In another aspect, the present invention provides a method of MRI imaging using magnetic nanoparticles of the invention. The invention also provides an MRI contrast agent comprising magnetic nanoparticles of the invention. The invention also provides a use of magnetic nanoparticles of the invention for MRI imaging. The invention also provides a use of magnetic nanoparticles of the invention as an MRI contrast agent. The invention also provides magnetic nanoparticles of the invention for use in MRI imaging. The invention also provides magnetic nanoparticles of the invention for use as an MRI contrast agent.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

The general chemical terms used in the formulae herein have their usual meanings.

For example, as used herein:

the term "alkyl" is intended to include straight chain and branched chain saturated hydrocarbon groups. In one embodiment, alkyl groups comprise 1 to 30 carbon atoms. In a preferred embodiment, alkyl groups comprise the aliphatic chain of a short chain, medium chain or long chain fatty acid. In another preferred embodiment, alkyl groups comprise 1 to 6 carbon atoms.

In another preferred embodiment, the alkyl group is methyl, ethyl, n-propyl, i-propyl, n-butyl, i-butyl or t-butyl;

the term "cycloalkyl" is intended to include cyclic saturated hydrocarbon groups;

the term "alkenyl" is intended to include straight chain and branched chain unsaturated hydrocarbon groups;

the term "cycloalkenyl" is intended to include cyclic unsaturated hydrocarbon groups;

the term "aryl" is intended to include aromatic radicals including, but not limited to: phenyl; naphthyl; indanyl; biphenyl; and the like. In one embodiment, aryl groups comprise 4 to 10 ring carbon atoms;

the term "heteroaryl" is intended to include heteroaromatic radicals including, but not limited to: pyrimidinyl; pyridyl; pyrrolyl; furyl; oxazolyl; thiophenyl; and the like; and the term "heterocyclyl" is intended to include non-aromatic heterocyclic radicals including, but not limited to: piperidinyl; pyrrolidinyl; piperazinyl; 1,4-dioxanyl; tetrahydrofuranyl; tetrahydrothiophenyl; and the like.

As used herein, the term "substituted" is intended to mean that one or more hydrogen atoms in the group indicated is replaced with one or more independently selected suitable substituents, provided that the normal valency of each atom to which the substituent/s are attached is not exceeded, and that the substitution results in a stable compound.

As used herein, the term "and/or" means "and", or "or", or both.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

As used herein, the terms "nanoparticle" and "nanocrystal" refer to any particle less than 100 nanometers in size.

Although a "nanocrystal" may have a higher degree of crystallinity than a nanoparticle, those persons skilled in the art will appreciate that references to nanoparticles in this specification also include nanocrystals.

As used herein, the term "magnetic nanoparticle" means a nanoparticle that is paramagnetic, superparamagnetic, ferromagnetic, ferrimagnetic, and/or antiferromagnetic.

In some embodiments a magnetic nanoparticle of the invention comprises metal, metal carbide, metal nitride, metal sulfide, metal phosphide, metal oxide or a mixture thereof.

In other embodiments a magnetic nanoparticle of the invention comprises a "core" of metal, metal carbide, metal nitride, metal sulfide, metal phosphide, or a mixture thereof surrounded by a "shell" of metal oxide. The term "core" refers to the central region of the nanoparticle. A core can substantially include a single homogeneous material or may be heterogeneous. A core may be crystalline, polyatomic or amorphous. Whilst a core may be referred to as crystalline, it is understood that the surface of the core may be amorphous or polycrystalline and that this non-crystalline surface layer may extend a finite depth into the core.

As used herein, the "size" of a nanoparticle refers to the diameter of the nanoparticle.

Although the present invention is broadly as defined above, those persons skilled in the art will appreciate that the invention is not limited thereto and that the invention also includes embodiments of which the following description gives examples.

BRIEF DESCRIPTION OF THE DRAWINGS

The invention will now be described with reference to the Figures in which.

DETAILED DESCRIPTION OF THE INVENTION

Figure 1:
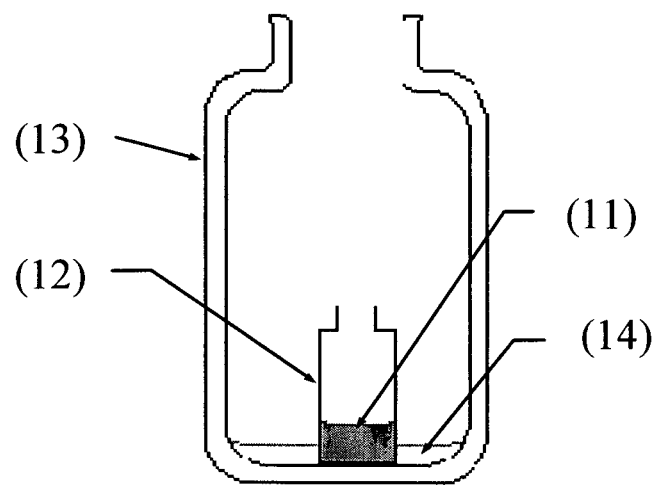
FIG. 1 is a diagram of one type of Fischer-Porter pressure reaction vessel apparatus useful in a method for preparing magnetic nanoparticles.

The present invention provides a multi-step method for preparing nanoparticles comprising metal, metal carbide, metal nitride, metal sulfide, metal phosphide, metal oxide or a mixture thereof. In some embodiments, the nanoparticles have a core comprising metal, metal carbide, metal nitride, metal sulfide, metal phosphide, or a mixture thereof and a metal oxide shell. In those embodiments, the first part of the method is the synthesis of nanoparticles comprising the metal, metal carbide, metal sulfide, metal nitride, metal phosphide, or mixture thereof; while the second part is the formation of the core/shell structure by oxidising the surface of the synthesised particles.

In a first aspect, the present invention provides a method for preparing magnetic nanoparticles, the method comprising:
 (a) preparing a solution of a precursor comprising at least one metal compound in a liquid reaction medium;
 (b) heating the solution to a first temperature and maintaining the first temperature for a first period of time to at least partially decompose the precursor;
 (c) optionally, heating or cooling the reaction mixture from step (b) to a second temperature and maintaining the second temperature for a second period of time to further decompose the precursor;
 (d) exposing the reaction mixture to an oxidising medium; and
 (e) recovering the resulting nanoparticles.

In one embodiment, the product nanoparticles comprise metal, metal carbide, metal nitride, metal sulfide, metal phosphide, metal oxide or a mixture thereof.

In one embodiment, the product nanoparticles comprise either metal or metal carbide. In another embodiment, the product nanoparticles comprise either: metal; metal carbide; or a mixture of metal and metal carbide. In another embodiment, the product nanoparticles comprise either: metal; metal carbide; metal nitride; or a mixture of any two or more of metal, metal carbide and metal nitride. In another embodiment, the product nanoparticles comprise either: metal; metal carbide; metal sulfide; or a mixture of any two or more of metal, metal carbide and metal sulfide. In another embodiment, the product nanoparticles comprise either: metal; metal carbide; metal phosphide; or a mixture of any two or more of metal, metal carbide and metal phosphide. In another embodiment, the product nanoparticles comprise either: metal; metal carbide; metal oxide; or a mixture of any two or more of metal, metal carbide and metal oxide.

In one embodiment, the product nanoparticles comprise either metal nitride or metal oxide. In another embodiment, the product nanoparticles comprise either: metal nitride; metal oxide; or a mixture of metal nitride and metal oxide. In another embodiment, the product nanoparticles comprise either: metal nitride; metal oxide; metal; or a mixture of any two or more of metal nitride, metal oxide, and metal. In another embodiment, the product nanoparticles comprise either: metal nitride; metal oxide; metal carbide; or a mixture of any two or more of metal nitride, metal oxide, and metal carbide. In another embodiment, the product nanoparticles comprise either: metal nitride; metal oxide; metal carbide; metal; or a mixture of any two or more of metal nitride, metal oxide, metal carbide, and metal.

In another embodiment, the product nanoparticles comprise either: metal nitride or metal. In another embodiment, the product nanoparticles comprise either: metal nitride; metal; or a mixture of metal nitride and metal.

In one embodiment, the product nanoparticles comprise either: metal carbide; or a mixture of metal and metal carbide. In another embodiment, the product nanoparticles comprise either: metal carbide; metal nitride; or a mixture of any two or more of metal, metal carbide and metal nitride. In another embodiment, the product nanoparticles comprise either: metal carbide; metal sulfide; or a mixture of any two or more of metal, metal carbide and metal sulfide. In another embodiment, the product nanoparticles comprise either metal carbide; metal phosphide; or a mixture of any two or more of metal, metal carbide and metal phosphide. In another embodiment, the product nanoparticles comprise either: metal carbide; metal oxide; or a mixture of any two or more of metal, metal carbide and metal oxide.

In one embodiment, the product nanoparticles comprise either: metal nitride; or a mixture of metal nitride and metal oxide. In another embodiment, the product nanoparticles comprise either: metal nitride; metal carbide; or a mixture of any two or more of metal nitride, metal carbide and metal oxide. In another embodiment, the product nanoparticles comprise either: metal nitride; metal; or a mixture of any two or more of metal nitride, metal and metal oxide. In another embodiment, the product nanoparticles comprise either: metal nitride; metal carbide; metal; or a mixture of any two or more of metal nitride, metal carbide, metal and metal oxide.

In another embodiment, the product nanoparticles comprise either: metal nitride; or a mixture of metal nitride and metal. In another embodiment, the product nanoparticles comprise either: metal nitride; metal oxide; or a mixture of any two or more of metal nitride, metal oxide and metal. In another embodiment, the product nanoparticles comprise either: metal nitride; metal carbide; metal oxide; or a mixture of any two or more of metal nitride, metal carbide, metal oxide and metal.

In one embodiment, the product nanoparticles comprise metal carbide. In another embodiment, the product nanoparticles comprise either: metal carbide; metal nitride; or a mixture of metal carbide and metal nitride. In another embodiment, the product nanoparticles comprise either: metal carbide; metal sulfide; or a mixture of metal carbide and metal sulfide. In another embodiment, the product nanoparticles comprise either: metal carbide; metal phosphide; or a mixture of metal carbide and metal phosphide. In another embodiment, the product nanoparticles comprise either: metal carbide; metal oxide; or a mixture of metal carbide and metal oxide.

In another embodiment, the product nanoparticles comprise various mixtures of the product nanoparticles set forth above.

In one embodiment, the product nanoparticles comprise metal nitride.

The nanoparticles produced in one embodiment of a method of the invention comprise a core/shell structure in which the core comprises metal, metal carbide, metal nitride, metal sulfide, metal phosphide, or a mixture thereof, and the shell comprises metal oxide.

Accordingly, in a further aspect, the present invention provides a method for preparing magnetic nanoparticles having a core comprising metal, metal carbide, metal nitride, metal sulfide, metal phosphide, or a mixture thereof and a metal oxide shell, the method comprising:
- (a) preparing a solution of a precursor comprising at least one metal compound in a liquid reaction medium;
- (b) heating the solution to a first temperature and maintaining the first temperature for a first period of time to at least partially decompose the precursor;
- (c) optionally, heating or cooling the reaction mixture from step (b) to a second temperature and maintaining the second temperature for a second period of time to further decompose the precursor;
- (d) exposing the reaction mixture to an oxidising medium; and
- (e) recovering the resulting nanoparticles.

In one embodiment, the product nanoparticles have a core/shell structure in which the cores comprise either metal or metal carbide and the shells comprise metal oxide. In another embodiment, the cores comprise either: metal; metal carbide; or a mixture of metal and metal carbide; and the shells comprise metal oxide. In another embodiment, the cores comprise either: metal; metal carbide; metal nitride; or a mixture of any two or more of metal, metal carbide and metal nitride; and the shells comprise metal oxide. In another embodiment, the cores comprise either: metal; metal carbide; metal sulfide; or a mixture of any two or more of metal, metal carbide and metal sulfide; and the shells comprise metal oxide. In another embodiment, the cores comprise either: metal; metal carbide; metal phosphide; or a mixture of any two or more of metal, metal carbide and metal phosphide; and the shells comprise metal oxide.

In one embodiment, the product nanoparticles have a core/shell structure in which the cores comprise either: metal carbide; or a mixture of metal and metal carbide; and the shells comprise metal oxide. In another embodiment, the cores comprise either: metal carbide; metal nitride; or a mixture of any two or more of metal, metal carbide and metal nitride; and the shells comprise metal oxide. In another embodiment, the cores comprise either: metal carbide; metal sulfide; or a mixture of any two or more of metal, metal carbide and metal sulfide; and the shells comprise metal oxide. In another embodiment, the cores comprise either: metal carbide; metal phosphide; or a mixture of any two or more of metal, metal carbide and metal phosphide; and the shells comprise metal oxide.

In one embodiment, the product nanoparticles have a core/shell structure in which the cores comprise metal carbide and the shells comprise metal oxide. In another embodiment, the cores comprise either: metal carbide; metal nitride; or a mixture of metal carbide and metal nitride; and the shells comprise metal oxide. In another embodiment, the cores comprise either: metal carbide; metal sulfide; or a mixture of metal carbide and metal sulfide; and the shells comprise metal oxide. In another embodiment, the cores comprise either: metal carbide; metal phosphide; or a mixture of metal carbide and metal phosphide; and the shells comprise metal oxide.

In another embodiment, the product nanoparticles comprise various mixtures of the product nanoparticles set forth above.

The metal carbide, metal nitride, metal sulfide, metal phosphide, and/or metal oxide may be stoichiometric or non-stoichiometric. In those embodiments wherein the metal carbide, metal nitride, metal sulfide, metal phosphide, and/or metal oxide are non-stoichiometric, they may be either metal-rich or metal-poor.

The precursor may be a single compound or a mixture of several compounds. The metal in the precursor may be in a single valence state, including zero valence, or in several valence states. In one embodiment, the precursor is a single-source precursor, that is it comprises: metal and carbon atoms; metal and nitrogen atoms; metal and sulfur atoms; metal and phosphorus atoms; metal, carbon and nitrogen atoms; metal, carbon and sulfur atoms; or metal, carbon and phosphorus atoms. When the precursor is a mixture of several compounds, the mixture may comprise one metal, which may be in a single valence state or in several valence states, or a mixture of several metals, each of which may independently be in a single valence state or in several valence states.

In one embodiment, a gas or mixture of gases may be used in the method. For example, a carbon-containing gas (such as acetylene or methane) may be used in those embodiments where it is desired to produce nanoparticles that comprise a metal carbide. Alternatively, a nitrogen-containing gas (such as ammonia) may be used in those embodiments where it is desired to produce nanoparticles that comprise a metal nitride. Alternatively, a sulfur-containing gas (such as hydrogen sulfide) may be used in those embodiments where it is desired to produce nanoparticles that comprise a metal sulfide. Alternatively, a phosphorus containing gas (such as phosphine) may be used in those embodiments where it is desired to produce nanoparticles that comprise a metal phosphide. In this embodiment, the gas or mixture of gases forms at least a component of the atmosphere in the reaction vessel during the decomposition of the precursor.

Accordingly, one embodiment of the invention provides a method for preparing magnetic nanoparticles, the method comprising:
- (a) preparing a solution of a precursor comprising at least one metal compound in a liquid reaction medium;
- (b) heating the solution in a reaction vessel under a hydrogen, methane, acetylene, ammonia, hydrogen sulfide or phosphine atmosphere to a first temperature and maintaining the first temperature for a first period of time to at least partially decompose the precursor;
- (c) optionally, heating or cooling the reaction mixture from step (b) to a second temperature and maintaining the second temperature for a second period of time to further decompose the precursor;
- (d) exposing the reaction mixture to an oxidising medium; and
- (e) recovering the resulting nanoparticles.

In one embodiment, the solution is heated under a hydrogen atmosphere. In another embodiment, the solution is heated under a methane atmosphere. In another embodiment, the solution is heated under an acetylene atmosphere. In another embodiment, the solution is heated under an ammonia atmosphere. In another embodiment, the solution is heated under a hydrogen sulfide atmosphere. In another embodiment, the solution is heated under a phosphine atmosphere.

In an alternative embodiment, step (b) comprises heating the solution in a reaction vessel under a hydrogen, methane, acetylene, ammonia, hydrogen sulfide, phosphine or inert gas atmosphere to a first temperature and maintaining the first temperature for a first period of time to at least partially decompose the precursor.

In one embodiment, the solution is heated under an inert gas atmosphere. In a preferred embodiment, the solution is heated under a nitrogen or an argon atmosphere. In another preferred embodiment, the solution is heated under a nitrogen atmosphere.

In one embodiment, the reaction vessel is a sealed pressure reaction vessel.

In a preferred embodiment, the metal is a transition metal and the precursor, therefore, comprises one or more transition metal compounds. In one embodiment, preferred transition metals include chromium, manganese, iron, cobalt, nickel and molybdenum. In another embodiment, preferred transition metals include chromium, manganese, iron, nickel and molybdenum. In another embodiment, preferred transition metals include chromium, manganese, iron, cobalt and molybdenum. In another embodiment, preferred transition metals include chromium, manganese, iron and molybdenum. In another preferred embodiment, the metal is iron and the precursor, therefore, comprises one or more iron compounds.

In one embodiment the precursor is a metal compound comprising at least one ligand that is not carbon monoxide or bis(trimethylsilyl)amide. In another embodiment the precursor is a metal compound comprising at least one ligand that is not carbon monoxide or an amide.

In a preferred embodiment, the precursor is an iron compound comprising at least one ligand that is not carbon monoxide or bis(trimethylsilyl)amide. In another embodiment the precursor is an iron compound comprising at least one ligand that is not carbon monoxide or an amide.

In one embodiment the precursor is an organometallic compound.

In another embodiment the precursor is an organometallic compound comprising at least one ligand that is not carbon monoxide.

In another embodiment the precursor is a metal compound comprising at least one polydentate ligand. Preferably, the polydentate ligand is a bidentate ligand.

In another embodiment the precursor is an organoiron compound. In another embodiment the precursor is an organoiron compound comprising at least one ligand that is not carbon monoxide.

In a preferred embodiment the precursor is a "sandwich" or "half-sandwich" organoiron compound.

In a preferred embodiment, the precursor is $Fe(C_5H_5)(C_6H_7)$, $Fe(C_5H_5)_2$ or a salt of $[Fe(C_5H_5)(C_6H_6)]^+$, preferably $[Fe(C_5H_5)(C_6H_6)](PF_6)$.

A preferred embodiment utilises a single precursor—the organoiron compound, $Fe(C_5H_5)(C_6H_7)$. Another preferred embodiment utilises iron(II) acetylacetonate as the precursor.

In one embodiment, the precursor is not iron pentacarbonyl. Iron pentacarbonyl is volatile and highly toxic, causing lung irritation, toxic pneumonitis, or pulmonary edema if inhaled.

In another embodiment, the precursor is not $Fe[N(SiMe_3)_2]_2$. $Fe[N(SiMe_3)_2]_2$ is also a hazardous material.

Suitable liquid reaction media have a boiling point that is at or above the decomposition temperature of the precursor.

The liquid reaction medium must be thermally stable at the reaction temperature or temperatures. The liquid reaction medium preferably solvates the precursor to ensure a homogenous liquid phase reaction.

In one embodiment, the liquid reaction medium comprises a surfactant. Advantageously, the use of a surfactant in a liquid phase reaction provides a barrier to nanoparticle aggregation through the interaction of the surfactant with the nanoparticle surface.

Surfactants are typically organic molecules that have both a hydrophilic end and a hydrophobic end. The hydrophobic end is typically a hydrocarbon, including but not limited to: alkyl, alkenyl, cycloalkyl and cycloalkenyl groups; and aryl groups. The hydrophilic end is typically a polarisable functional group including, but not limited to: various acids, such as carboxylic, sulfinic, sulfonic, phosphinic and phosphonic acids, and their salts; primary, secondary, ternary or quaternary amines; halides; oxides; thiols; phosphines; phosphides; phosphates; glycols; or mixtures thereof.

Preferred surfactants do not take part in parasitic side-reactions with any other reagent or with the precursor/s.

In one embodiment, preferred surfactants include oleylamine, hexadecylamine, trioctylamine and trioctylphosphine.

The molecular structure of the surfactant comprises a functional group that is capable of interacting with the nanoparticle surface. The surfactant forms a thin layer that is weakly bound to the nanoparticle surface and inhibits aggregation of the nanoparticles.

In one embodiment, the liquid reaction medium comprises a mixture of one or more surfactants and one or more solvents. Alternatively, the liquid reaction medium comprises one or more surfactants, which also act as the solvent.

In one embodiment, the solvent is selected from the group consisting of: ethers; heterocyclic compounds; aromatic compounds; dimethyl sulfoxide (DMSO); dimethylformamide (DMF); alcohols; alkenes; and alkanes. Preferred ethers include mono- or poly-ethylene glycol ethers, crown ethers, phenyl ethers, octyl ether, butyl ether, hexyl ether, and decyl ether. Preferred heterocyclic compounds include pyridine and tetrahydrofuran (THF). Preferred aromatic compounds include toluene, xylene, mesitylene, benzene, and halobenzenes, such as dichlorobenzene. Preferred alcohols include octanol and decanol. Preferred alkanes include pentane, hexane, heptane, octane, decane, dodecane, tetradecane and hexadecane.

In a preferred embodiment, the liquid reaction medium comprises a mixture of a surfactant and a solvent. Preferably, the surfactant is oleylamine. Preferably, the solvent is toluene, dichlorobenzene or mesitylene.

In an alternative embodiment, oleylamine is used as the liquid reaction medium.

In one embodiment, the precursor is dissolved in the liquid reaction medium at room temperature to form a solution. Stirring and/or sonication may be used to promote dissolution of the precursor. Although heating the liquid reaction medium may aid in dissolving the precursor, the use of heat should generally be avoided to prevent premature decomposition of the precursor. In some embodiments, the precursor is only partially dissolved in the liquid reaction medium at room temperature and the remainder of the precursor is, for example, suspended in the solution.

The method of the invention may be carried out using a controlled atmosphere glovebox or similar equipment. However, in a preferred embodiment, the precursor is relatively stable and simple Schlenk-line or similar gas-purged apparatus may be used.

In one embodiment, the solution of the precursor in the liquid reaction medium is placed in a pressure reaction vessel, for example a Fischer-Porter bottle equipped with a two-valve adaptor. The reaction vessel may be degassed and filled with a suitable gas or mixture of gases prior to reaction. The atmosphere during the reaction is the gas within the reaction vessel together with any volatile components of the solution of the precursor in the liquid reaction medium.

In an alternative embodiment, illustrated in FIG. 1, the solution (11) of the precursor in the liquid reaction medium is placed in a container (12), such as a vial, which in turn is placed in the reaction vessel (13), for example a Fischer-Porter bottle. An excess amount of solvent (14) is added to the reaction vessel to maintain the concentration of the species in the reaction mixture in the vial throughout the reaction.

In one embodiment, the reaction vessel is degassed and filled with the desired gas, for example hydrogen, to a pressure up to about 10 bar. In another embodiment, the pressure is in the range of about 1 to about 3 bar.

In those embodiments wherein the reaction vessel is filled with hydrogen, the hydrogen may act as a reducing agent for reducing the metal precursor and/or preventing oxidation of the metal during the reaction. As discussed above, other reactive gases, such as methane ($CH_4$), acetylene ($C_2H_2$), ammonia ($NH_3$), hydrogen sulfide ($H_2S$), and phosphine ($PH_3$), may be used as at least a component of the atmosphere within the reaction vessel.

Alternatively, an inert gas atmosphere, such as nitrogen or argon, may be used in those embodiments where a reactive gas atmosphere is not desired.

In an alternative embodiment, the reaction is carried out using benchtop glassware apparatus. The solid precursor and the liquid reaction medium may be first degassed with nitrogen separately in sealed flasks or other suitable containers prior to reaction, which is carried out under a nitrogen atmosphere. Other inert gas atmospheres, such as argon and helium, may also be used.

Figure 2:
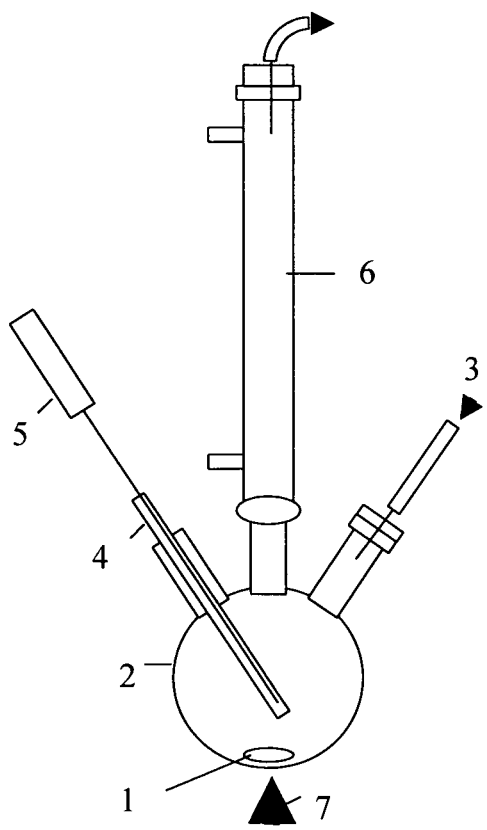
FIG. 2 is a diagram of the three-necked round bottom flask apparatus useful in a method for preparing magnetic nanoparticles.

In this embodiment, the reaction is carried out in apparatus such as that shown in FIG. 2. The solid precursor (1) is placed in a three-necked round bottom flask (2), which is then fitted with a probe thermometer pocket (4) holding a thermometer probe (5), a septum-sealed condenser (6) and a septum through which the degassed liquid reaction medium (3) is introduced into the flask by standard techniques, for example using a syringe or cannula. The flask is heated with a suitable heat source (7).

In those embodiments wherein the liquid reaction mixture comprises a mixture of one or more surfactants and one or more solvents, the concentration of the precursor is calculated based on the total volume of the one or more solvents. However, in those embodiments wherein one or more surfactants act as the solvent, the concentration of the precursor is calculated based on the volume of the one or more surfactants.

In one embodiment, the concentration of the precursor in the liquid reaction medium is relatively high, for example greater than about 0.1 M. In some embodiments, the concentration of the precursor may influence both the size and shape of the nanoparticles. More particularly, in some embodiments higher precursor concentrations promote the formation of larger nanoparticles.

The solution of the precursor in the liquid reaction medium is heated to a first temperature, which is maintained for a first period of time to at least partially decompose the precursor.

In one embodiment, the method utilises a single temperature reaction, and excludes the optional step (c).

In one embodiment, the reaction mixture is then heated or cooled to a second temperature, which is maintained for a second period of time to further decompose the precursor.

In a preferred embodiment, the precursor decomposes thermally. In another embodiment, the precursor at least partially decomposes by reacting with itself and/or other substances present in the liquid reaction medium or atmosphere. For example, in those embodiments wherein the reaction vessel is filled with a reactive gas, such as methane ($CH_4$), acetylene ($C_2H_2$), ammonia ($NH_3$), hydrogen sulfide ($H_2S$), and phosphine ($PH_3$), the precursor may partially decompose by reacting with that gas.

In one embodiment that utilises a two temperature reaction, the second temperature is higher than the first temperature. In an alternative embodiment, the second temperature is lower than the first temperature.

Without wishing to be bound by theory, it is believed that, in those embodiments utilising a two temperature reaction, the partial decomposition of the precursor at the first temperature creates very small nanoparticle nuclei of about 1-2 nm in size, while the further decomposition of the precursor at the second temperature results in growth of the nanoparticle nuclei to give the product nanoparticles.

The selection of the first and second temperatures and the times for which each of the temperatures is maintained will depend on the particular precursor and liquid reaction medium used. The temperatures must be sufficient to at least partially decompose the precursor. In those embodiments wherein the reaction is in apparatus such as that illustrated in FIG. 1, if the temperature is too high, then the amount of liquid reaction medium vaporised in the reaction vessel may result in the reaction mixture drying out or in excessive pressure in the reaction vessel.

Those persons skilled in the art will be able to select appropriate reaction temperatures and times without undue experimentation. The ability to select the reaction temperature and time provides a degree of control over the size of the resulting nanoparticles.

In those embodiments that utilise a single temperature reaction, a higher reaction temperature will generally favour the formation of smaller nanoparticles.

In one embodiment that utilises a single temperature reaction, the reaction temperature is below about 350° C. In other embodiments, the reaction temperature is below about 340° C., 330° C., 320° C., 310° C., 300° C., 290° C., 280° C., 270° C., 260° C., 250° C., 240° C., 230° C., 220° C., 210° C., 200° C., 190° C., 180° C., 170° C., 160° C., 150° C., 140° C., 130° C., 120° C., 110° C., 100° C., 90° C., 80° C., 70° C., 60° C., or 50° C.

In one embodiment that utilises a single temperature reaction, the reaction temperature is above about 50° C. In other embodiments, the reaction temperature is above about 60° C., 70° C., 80° C., 90° C., 100° C., 110° C., 120° C., 130° C., 140° C., 150° C., 160° C., 170° C., 180° C., 190° C., 200° C., 210° C., 220° C., 230° C., 240° C., 250° C., 260° C., 270° C., 280° C., 290° C., or 300° C.

In another embodiment, the reaction temperature is between a temperature selected from any of the above-recited maxima and a temperature selected from any of the above-recited minima that is below the selected maximum.

In another embodiment, the reaction temperature is from about 50° C. to about 300° C. In another embodiment, the reaction temperature is from about 50° C. to about 250° C. In another embodiment, the reaction temperature is from about 60° C. to about 200° C. In another embodiment, the reaction temperature is from about 80° C. to about 180° C. In another embodiment, the reaction temperature is from about 130° C. to about 180° C.

In some embodiments, utilising a two temperature reaction may be advantageous to provide greater monodispersity of the particle size of the nanoparticle product when compared to a single temperature reaction. The monodispersity of the nanoparticles may be measured by, for example, examining TEM images of randomly chosen different areas of different TEM grids.

In one embodiment that utilises a two temperature reaction, the first and second reaction temperatures are independently below about 350° C. In other embodiments, the first and second reaction temperatures are independently below about 340° C., 330° C., 320° C., 310° C., 300° C., 290° C., 280° C., 270° C., 260° C., 250° C., 240° C., 230° C., 220° C., 210° C., 200° C., 190° C., 180° C., 170° C., 160° C., 150° C., 140° C., 130° C., 120° C., 110° C., 100° C., 90° C., 80° C., 70° C., 60° C., or 50° C.

In one embodiment that utilises a two temperature reaction, the first and second reaction temperatures are independently above about 50° C. In other embodiments, the first and second reaction temperatures are independently above about 60° C., 70° C., 80° C., 90° C., 100° C., 110° C., 120° C., 130° C., 140° C., 150° C., 160° C., 170° C., 180° C., 190° C., 200° C., 210° C., 220° C., 230° C., 240° C., 250° C., 260° C., 270° C., 280° C., 290° C., or 300° C.

In another embodiment, the first and second reaction temperatures are independently between a temperature selected from any of the above-recited maxima and a temperature selected from any of the above-recited minima that is below the selected maximum.

In another embodiment, the first and second reaction temperatures are independently from about 50° C. to about 300° C. In another embodiment, the first and second reaction temperatures are independently from about 50° C. to about 250° C. In another embodiment, the first and second reaction temperatures are independently from about 60° C. to about 200° C. In another embodiment, the first and second reaction temperatures are independently from about 80° C. to about 180° C. In another embodiment the first reaction temperature is from about 80° C. to about 165° C. and the second reaction temperature is from about 110° C. to about 120° C.

In those embodiments wherein the precursor is $Fe(C_5H_5)(C_6H_7)$, the reaction temperature is generally below about 200° C.

In those embodiments wherein the precursor is $Fe(C_5H_5)(C_6H_7)$, a higher reaction temperature typically results in nanoparticle cores having a greater proportion of iron carbide than iron.

In one embodiment that utilises a single temperature reaction, and wherein the precursor is $Fe(C_5H_5)(C_6H_7)$, the reaction temperature is typically about 130° C. In another embodiment, the reaction temperature is typically about 180° C. In one embodiment wherein the reaction is in a sealed reaction vessel the reaction temperature is maintained for about 50 hours. In another embodiment wherein the reaction is in apparatus such as that illustrated in FIG. 2, the reaction temperature is maintained for about 2 hours.

In one embodiment that utilises a two temperature reaction, and wherein the precursor is $Fe(C_5H_5)(C_6H_7)$, the first temperature is typically about 80° C. In those embodiments wherein the reaction is in apparatus such as that illustrated in FIG. 1, this temperature is maintained for about 24 hours. In those embodiments wherein the reaction is in apparatus such as that illustrated in FIG. 2, this temperature is maintained for about 12 hours.

In one embodiment that utilises a two temperature reaction, and wherein the precursor is $Fe(C_5H_5)(C_6H_7)$, the second temperature is below about 200° C., and is typically about 110° C. In those embodiments wherein the reaction is in apparatus such as that illustrated in FIG. 1, this temperature is generally maintained for a longer period of time than was the first temperature, typically in the range of about 48 to about 96 hours. In those embodiments wherein the reaction is in apparatus such as that illustrated in FIG. 2, this temperature may be maintained for about 9 hours.

In one embodiment that utilises a two temperature reaction, and wherein the precursor is iron(II) acetylacetonate, the first temperature is typically about 165° C. In those embodiments wherein the reaction is in apparatus such as that illustrated in FIG. 1, this temperature is maintained for about 1 hour.

In one embodiment that utilises a two temperature reaction, and wherein the precursor is iron(II) acetylacetonate, the second temperature is lower than the first, and is typically about 120° C. In those embodiments wherein the reaction is in apparatus such as that illustrated in FIG. 1, this temperature is generally maintained for a longer period of time than was the first temperature, typically about 24 hours.

In preferred embodiments, temperature fluctuations are avoided. In these embodiments, the reaction temperature is maintained within a narrow range to promote nanoparticle nucleation and/or growth. In a particularly preferred embodiment, the reaction temperature is maintained with a range of ±about 2° C.

In those embodiments wherein the reaction is carried out in apparatus such as that illustrated in FIG. 1, the reaction vessel may conveniently be heated in an oven, which is preset to the selected temperature. Alternatively, when the reaction is carried out in apparatus such as that illustrated in FIG. 2, the reaction flask may be heated, and the temperature controlled, using conventional heat sources and thermostats.

The reaction mixture is then allowed to cool and is exposed to an oxidising medium. However, in an alternative embodiment, the reaction mixture is exposed to an oxidising medium without first being cooled. In some embodiments, the oxidising medium completely oxidises the nanoparticles. In other embodiments, the oxidising medium oxidises the surface of the nanoparticles to form a passivation layer. In one embodiment, the passivation layer comprises metal oxide. The passivation layer substantially reduces the reactivity of the nanoparticles to oxidation, such that they may be stored under ambient conditions. In one embodiment, the passivation layer is about 3 nm thick. In one embodiment, the nanoparticles are stable to further oxidation for more than one year.

Conveniently, the passivation layer may be formed by exposing the reaction mixture to atmospheric oxygen, for example by opening the reaction vessel or removing any inert gas or reactive gas atmosphere. Other methods of oxidising the surface of the nanoparticles to form a passivation layer will be apparent to those persons skilled in the art. For example, oxygen may be bubbled through the reaction mixture after nanoparticle formation.

Accordingly, in a preferred embodiment, the oxidising medium is air.

The magnetic nanoparticles are then recovered from the reaction mixture. The nanoparticles may be recovered using a number of techniques known to those persons skilled in the art, such as nanoparticle flocculation and centrifugation, and two phase separation using immiscible solvents.

The recovery of the nanoparticles and their exposure to an oxidising medium may occur in one step, in that exposure to ambient oxygen during the recovery of the nanoparticles oxidises the surface of the nanoparticles to form the passivation layer.

In a preferred embodiment, the magnetic nanoparticles are recovered by magnetic separation.

In this embodiment, the reaction mixture containing the nanoparticles is washed with a suitable solvent or solvent mixture to remove the surfactant. Sonication may be used to ensure thorough washing of the nanoparticles. Suitable solvents include, but are not limited to: toluene; and mixtures of toluene and methanol. As the surfactant is removed from the reaction mixture, it is stripped from the surface of the nanoparticles. The surface of the nanoparticles is oxidised due to exposure to ambient oxygen during the recovery process.

In one embodiment, the washing solvent is degassed. This may reduce clustering and aggregation of the nanoparticle product.

A magnet or any other suitable means for applying a magnetic field may be used to retain the magnetic nanoparticles in the reaction vessel as the washing solvent is removed. This method also provides for a degree of size selection of the nanoparticles. Nanoparticles having a smaller size will have a smaller magnetic moment, and hence will be less affected by the applied external magnetic field. These smaller nanoparticles will tend to remain in the bulk solution, and can be removed with the washing solvent. Those persons skilled in the art will appreciate that the time delay between applying the magnetic field, after mixing the nanoparticles with the washing solvent, and removing the washing solvent can be optimised to maximise the retention of larger nanoparticles.

In one embodiment, the product nanoparticles can be isolated using a flow or microfluidic device equipped with an applied magnetic field. The magnetic nanoparticle suspension flows through a channel and the magnetic nanoparticles are retained where the magnetic field is applied. The retained magnetic nanoparticles can be collected when the magnetic field is removed by, for example, pumping a solvent through the channel.

The washing process may be repeated such that the excess surfactant is removed. The magnetic nanoparticles can then be collected after being dried in air or in a flow of nitrogen or another gas or mixture of gases, or after being dried in vacuo.

In an alternative embodiment, the product nanoparticles are dried in vacuo without further washing. Using a magnet or any other suitable means for applying a magnetic field, the magnetic nanoparticles may be retained in the reaction vessel as the excess surfactant and solvent are removed. The nanoparticle product is then dried in vacuo. In this embodiment, the product nanoparticles will retain a surface layer comprising the surfactant.

A preferred embodiment of the invention provides a method for preparing magnetic nanoparticles, the method comprising:
(a) preparing a solution of a precursor comprising at least one organoiron compound, which comprises at least one ligand that is not carbon monoxide, in a liquid reaction medium;
(b) heating the solution in a reaction vessel under a hydrogen atmosphere to a first temperature and maintaining the first temperature for a first period of time to at least partially decompose the precursor;
(c) exposing the reaction mixture to an oxidising medium; and
(d) recovering the resulting nanoparticles.

Preferably, the organoiron compound is $Fe(C_5H_5)(C_6H_7)$. Preferably, the liquid reaction medium comprises oleylamine. Preferably, the liquid reaction medium further comprises mesitylene. Preferably, the magnetic nanoparticles have a core/shell structure in which the cores comprise either iron or iron carbide and the shells comprise iron oxide.

Another preferred embodiment of the invention provides a method for preparing magnetic nanoparticles, the method comprising:
(a) preparing a solution of a precursor comprising at least one organoiron compound, which comprises at least one ligand that is not carbon monoxide, in a liquid reaction medium;
(b) heating the solution in a reaction vessel under a hydrogen atmosphere to a first temperature and maintaining the first temperature for a first period of time to at least partially decompose the precursor;
(c) heating the reaction mixture from step (b) to a second temperature and maintaining the second temperature for a second period of time to further decompose the precursor;
(d) exposing the reaction mixture to an oxidising medium; and
(e) recovering the resulting nanoparticles.

Preferably, the organoiron compound is $Fe(C_5H_5)(C_6H_7)$. Preferably, the liquid reaction medium comprises oleylamine. Preferably, the liquid reaction medium further comprises toluene. Preferably, the magnetic nanoparticles have a core/shell structure in which the cores comprise either iron or iron carbide and the shells comprise iron oxide.

Another preferred embodiment of the invention provides a method for preparing magnetic nanoparticles, the method comprising:
(a) preparing a solution of a precursor comprising at least one organoiron compound, which comprises at least one ligand that is not carbon monoxide, in a liquid reaction medium;
(b) heating the solution in a reaction vessel under an inert atmosphere to a first temperature and maintaining the first temperature for a first period of time to at least partially decompose the precursor;
(c) heating the reaction mixture from step (b) to a second temperature and maintaining the second temperature for a second period of time to further decompose the precursor;
(d) exposing the reaction mixture to an oxidising medium; and
(e) recovering the resulting nanoparticles.

Preferably, the organoiron compound is $Fe(C_5H_5)(C_6H_7)$. Preferably, the liquid reaction medium comprises oleylamine. Preferably, the liquid reaction medium further comprises toluene. Preferably, the magnetic nanoparticles have a core/shell structure in which the cores comprise iron and the shells comprise iron oxide.

Another preferred embodiment of the invention provides a method for preparing magnetic nanoparticles, the method comprising:
(a) preparing a solution of a precursor comprising at least one organoiron compound, which comprises at least one ligand that is not carbon monoxide, in a liquid reaction medium;
(b) heating the solution in a reaction vessel under an inert atmosphere to a first temperature and maintaining the first temperature for a first period of time to at least partially decompose the precursor;
(c) exposing the reaction mixture to an oxidising medium; and
(d) recovering the resulting nanoparticles.

Preferably, the organoiron compound is $Fe(C_5H_5)(C_6H_7)$. Preferably, the liquid reaction medium comprises oleylamine. Preferably, the liquid reaction medium further comprises dichlorobenzene. Preferably, the magnetic nanoparticles have a core/shell structure in which the cores comprise either iron or iron carbide and the shells comprise iron oxide.

Another preferred embodiment of the invention provides a method for preparing magnetic nanoparticles, the method comprising:
(a) preparing a solution of a precursor comprising at least one iron compound, which comprises at least one ligand that is not carbon monoxide or bis(trimethylsilylamide), in a liquid reaction medium;

(b) heating the solution in a reaction vessel under an ammonia atmosphere to a first temperature and maintaining the first temperature for a first period of time to at least partially decompose the precursor;
(c) cooling the reaction mixture from step (b) to a second temperature and maintaining the second temperature for a second period of time to further decompose the precursor;
(d) exposing the reaction mixture to an oxidising medium; and
(e) recovering the resulting nanoparticles.

Preferably, the iron compound is iron(II) acetylacetonate. Preferably, the liquid reaction medium comprises oleylamine. Preferably, the liquid reaction medium further comprises mesitylene. Preferably, the magnetic nanoparticles comprise iron nitride or iron oxide.

In one embodiment, the product nanoparticles may be mixed with a ligand which, in excess amount, will replace the surfactant on the surface of the nanoparticles. Alternatively, the ligand may cover only a portion of the product nanoparticles' surface.

In one embodiment, the product nanoparticles are redispersed in a suitable solvent or solvent mixture containing the ligand. The ligand-coated magnetic nanoparticles can then be collected with the aid of magnetic separation, in which the surfactant is removed together with the washing solvent.

In an alternative embodiment, the surfactant may be stripped from the surface of the nanoparticles, as described above, and the nanoparticles mixed with a ligand or a solution thereof, such that the ligand molecules cover the nanoparticles' surface or a portion thereof.

In a further alternative embodiment, the nanoparticles are dried in vacuo without further washing, as described above, and the nanoparticles mixed with a ligand or a solution thereof, such that the ligand molecules cover the nanoparticles' surface or a portion thereof.

Other components, for example acids or bases, may be included in the solvent or solvent mixture to promote exchange of the surfactant and ligand.

The ligand-coated nanoparticles can then be redispersed in a suitable solvent for direct use in the desired application.

In one embodiment, the ligand is a compound of the formula R-L-A wherein L is a linker group, R is a group having the desired functionality and A is a functional group capable of bonding to the nanoparticle surface. Such R and A groups include, but are not limited to:
—$NH_2$; —N=C=O; epoxide; maleimide; —COOH; —$COOCH_3$; —$CONH_2$; —OH; —CHO; —Cl; —F; —Br; —I; —$PO_2H$; —$PH_2$; —SH; —$SO_3H$; —CH=$CH_2$; —O—$CH_2$—CH=$CH_2$; —C(=O)—CH=$CH_2$; —C(=O)—C($CH_3$)=$CH_2$; and —C≡CH; and salts thereof.

In a preferred embodiment, R is —COOH. In another preferred embodiment, A is —SH.

The linker group, L, may be a bond, a single atom, or a straight chain, branched or cyclic group comprising multiple atoms. Examples of suitable L groups include optionally substituted alkyl, optionally substituted cycloalkyl, optionally substituted alkenyl, optionally substituted cycloalkenyl and optionally substituted aryl. Suitable L groups may also include heteroatoms, such as heterocyclyl and heteroaryl groups.

The L group may also comprise various functional groups. Examples of the functional groups include ester groups (including carboxylic acid esters, carbonic acid esters, sulfonic acid esters, and sulfinic acid esters); amide groups (including carboxamides, urethane, sulfamides, sulfonamides, and sulfinamides); ethers; thioethers; disulfides; amino groups; and imido groups. The functional groups may be optionally substituted. Two or more independently selected functional groups may be present within each L.

In one embodiment, water soluble nanoparticles may be produced by reacting the nanoparticles with a compound of the formula R-L-A wherein R is a polar functional group. In an alternative embodiment, biochemically functionalised nanoparticles may be prepared by reacting the nanoparticles with a compound of the formula R-L-A, wherein R is a functional group capable of binding to a biological antibody and/or biologically active molecule.

In a preferred embodiment, the compound R-L-A is dimercaptosuccinic acid (DMSA).

In another aspect, the present invention provides magnetic nanoparticles when prepared by a method of the invention.

Those embodiments in which R is a functional group capable of binding to a biological antibody and/or biologically active molecule may be particularly advantageous for use in magnetic bioseparation applications.

During magnetic bioseparation, magnetic particles are added into a solution containing the target molecule or cell. Through a linker on the particle surface, the magnetic particles can selectively bind to the biomolecule of interest e.g. DNA or RNA. A magnetic field can then be applied to extract the magnetic particles coupled to the target analyte allowing undesired molecules to be removed. Applications for bioseparation include total mRNA isolation from cells, cDNA, double stranded and single stranded DNA purification, and purification of tagged proteins and cell types.

Bulk $Fe_3C$ has a saturation magnetization of 100 emu $g^{-1}$ at room temperature. Bulk iron is ferromagnetic and has low field saturation with high magnetic moment density 213 emu $g^{-1}$ at room temperature. Known ferromagnetic iron oxide nanoparticles are either magnetite ($Fe_3O_4$) or maghemite ($\gamma$-$Fe_2O_3$) and the magnetic moment density of these materials is shown in Table 1 below.

TABLE 1

Bulk saturation magnetisation ($M_S$) for various materials at 300K

| Material | $M_{S(bulk)}$ at 300K (emu/g) |
|---|---|
| Fe | 213 |
| $Fe_3O_4$ | 84 |
| $\gamma$-$Fe_2O_3$ | 74 |
| $Fe_3C$ | 100 |
| $\gamma'$-$Fe_4N$ | 186 |
| $\epsilon$-$Fe_3N$ | 123 |

There is a change in the magnetic behaviour of ferromagnetic, antiferromagnetic or ferrimagnetic materials to superparamagnetism as the particle size of these materials get small. Very small nanoparticles of ferromagnetic, antiferromagnetic or ferrimagnetic materials will tend to be superparamagnetic.

Superparamagnetic materials do not retain the magnetic moment once the applied field is removed, meaning they have zero coercivity. This behaviour is also exhibited by paramagnetic materials, but superparamagnetic materials have a much larger saturation magnetisation (comparable to those exhibited by ferromagnetic materials) and respond much more effectively towards the applied field than paramagnetic materials.

Therefore, superparamagnetic nanoparticles are ideal for use in applications such as bioseparation and as MRI imaging or contrast agents. In MRI applications, superparamagnetic nanoparticles can affect the magnetic environment around tissue but, because they do not have a remnant magnetisation, they are not attracted to one another and do not aggregate together. Aggregation is undesirable because it adversely affects the MRI signal. Superparamagnetic nanoparticles are useful for bioseparation applications because they do not aggregate and can be readily resuspended.

Ferromagnetic materials have non-zero coercivity. They retain certain magnetisation after the removal of an applied field, and a field of opposite direction is required to bring the magnetisation back to zero. Greater field strength is needed if the material has larger coercivity.

Ferromagnetic materials are most desirable for high-density data storage. Ferromagnetic materials with large coercivity are also sought after for spintronics applications, which is a reasonably new and emerging technology.

Both the coercivity and saturation magnetisation are dependent upon the material, particle size, and temperature. At a sufficiently small particle size, a ferromagnetic material can exhibit superparamagnetism when the thermal energy is able to overcome the magnetisation of the entire particle. On the other hand, a superparamagnetic material can become ferromagnetic at temperatures below its blocking temperature, which is the minimum temperature required for sufficient thermal energy to overcome the magnetisation.

For example, iron nanoparticles become superparamagnetic at room temperature when the particle size is less than about 15 nm, and ferromagnetic if it is larger than 15 nm. Materials such as $Fe_3O_4$ are superparamagnetic at a particle size of about 50 nm or smaller; while $\alpha''$-$Fe_{16}N_2$ is expected to retain ferromagnetic properties to a particle size of 5 nm. $Fe_3C$ is expected to exhibit magnetic properties that are somewhere between those exhibited by iron and $Fe_3O_4$.

Accordingly, another aspect of the invention provides a method of magnetic bioseparation using magnetic nanoparticles of the invention. The invention also provides a use of magnetic nanoparticles of the invention for magnetic bioseparation. The invention also provides magnetic nanoparticles of the invention for use in magnetic bioseparation.

Another aspect of the invention provides a method of MRI imaging using magnetic nanoparticles of the invention. The invention also provides an MRI contrast agent comprising magnetic nanoparticles of the invention. The invention also provides a use of magnetic nanoparticles of the invention for MRI imaging. The invention also provides a use of magnetic nanoparticles of the invention as an MRI contrast agent. The invention also provides magnetic nanoparticles of the invention for use in MRI imaging. The invention also provides magnetic nanoparticles of the invention for use as an MRI contrast agent.

The methods of the present invention permit the preparation of magnetic nanoparticles comprising different materials. By providing a degree of control over the composition and size (and shape) of the nanoparticles, the present methods are able to produce nanoparticles having different magnetic properties.

In one embodiment, wherein the method is carried out in a sealed reaction vessel such as the apparatus shown in FIG. 1, the relationship between the particle size and reaction temperature is typically inversely proportional. However, in those embodiments wherein the method is carried out in apparatus such as that shown in FIG. 2, it appears that the particle size is proportional to the reaction temperature.

Those persons skilled in the art will appreciate that the selection of precursor concentrations and reaction times may also affect the monodispersity and yield of the nanoparticle product. In some embodiments the methods of the present invention provide yields of the magnetic nanoparticles of up to about 50%. In one embodiment, the standard deviation of the nanoparticle size distribution is between about 10% and about 25%.

Other variables, such as the type of surfactant and pressure may be significant, and a person skilled in the art will be able to select suitable reagents and reaction conditions without undue experimentation.

Advantageously, the methods of the present invention provide magnetic nanoparticles having a saturation magnetisation that is typically not less than about 40 emu/g (or 40 $Am^2$/kg). By selection of appropriate reaction conditions, the methods of the present invention provide magnetic nanoparticles having large range of coercivity, from zero or near-zero (suitable for applications in the bio-medical field) up to about 500 Oe (or 40 kA/m) (suitable for applications in spintronics and high-density data storage).

The following non-limiting examples are provided to illustrate the present invention and in no way limit the scope thereof.

EXAMPLES $Fe(C_5H_5)(C_6H_7)$ was prepared according to the method described in Green, M. L. H. et al. *J. Chem. Soc.* 1960, 989.

Example 1

A mixture of 4 mmol $Fe(C_5H_5)(C_6H_7)$, 12 mmol (4 mL) oleylamine and 16 mL mesitylene was placed in a Fischer-Porter bottle fitted with a two-valve adaptor. The molar ratio of iron to oleylamine was 1:3. The concentration of the iron precursor, based on the volume of mesitylene, was 0.25 M. The bottle was degassed and filled with hydrogen to a pressure of 1 bar then sealed.

The sealed Fischer-Porter bottle was placed in an oven at 130° C. for 50 hours, then removed and allowed to cool to room temperature.

The black, magnetic precipitate was collected by washing with toluene (3×10 mL), with the aid of magnetic separation as described in the following paragraph.

The Fischer-Porter bottle was opened and the reaction solution was transferred to a sample bottle, which was then placed next to a magnet. The black precipitate was attracted to the side of the bottle next to the magnet. The solution was removed from the bottle with a pipette without disturbing the precipitate to leave a powder. About 10 mL of toluene was added to redisperse the precipitate. If the precipitate did not instantly redisperse, the mixture was sonicated for up to 2 minutes. The black precipitate was again attracted to the side of the bottle using the magnet and the solution removed without disturbing the precipitate. The precipitate was washed twice more with toluene.

Figure 3:
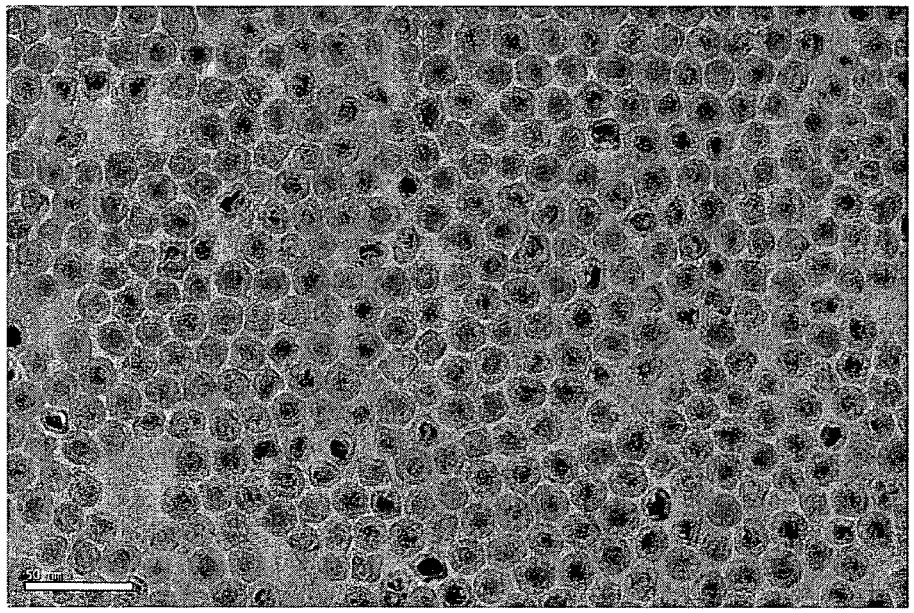
FIG. 3 is a transmission electron micrograph of iron-iron carbide/iron oxide core/shell nanoparticles.
Figure 4:
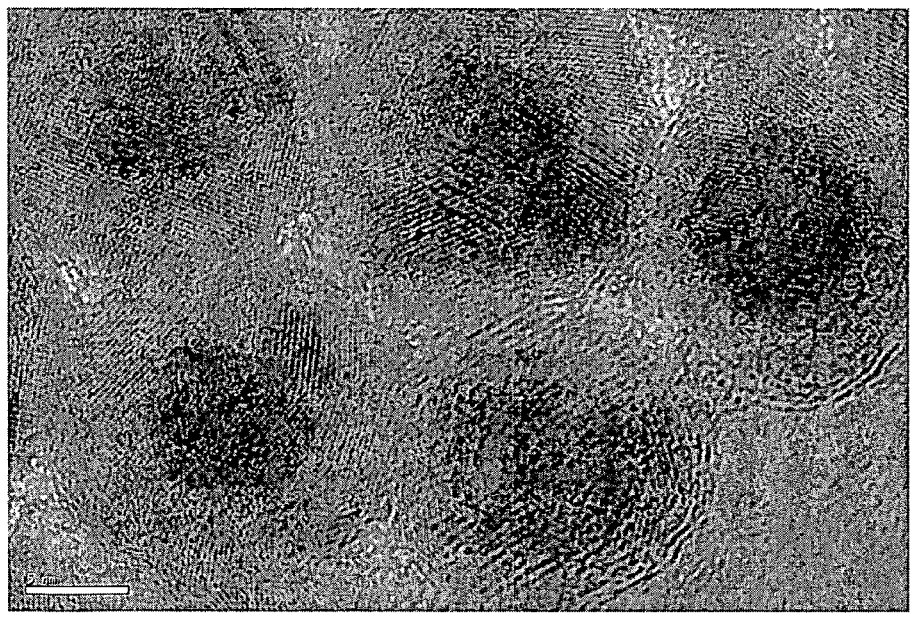
FIG. 4 is a magnification of the transmission electron micrograph of FIG. 3.
Figure 5:
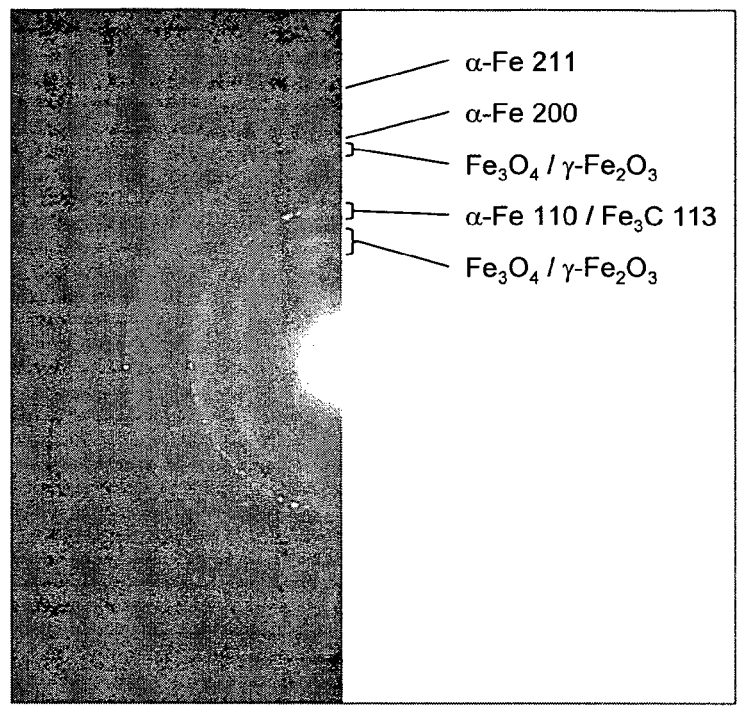
FIG. 5 is a selected area electron diffraction (SAED) pattern of the iron-iron carbide/iron oxide core/shell nanoparticles shown in FIGS. 3 and 4.

A transmission electron micrograph of the resulting nanoparticles is shown in FIG. 3. The scale bar is 50 nm. The resulting nanoparticles comprised core/shell structures, with spherical or near-spherical shapes, and tended to self-assemble into a monolayer with hexagonal packing when dried on a TEM grid. The nanoparticle size was typically 12 nm±2 nm—with a 6-8 nm core and a shell thickness of 2-3 nm. A high resolution micrograph of the nanoparticles is shown in FIG. 4. The scale bar is 5 nm. Each nanoparticle was highly crystalline, comprising an iron carbide ($Fe_3C$) or iron core and an iron oxide shell. Graphitic layers were present as a second shell. The selected area electron diffraction (SAED) pattern of the nanoparticles is shown in FIG. 5.

These nanoparticles were expected to have near-zero coercivity at room temperature.

Repeating the procedure at larger scale produced approximately 0.1 g of magnetic nanoparticles (yield approximately 50%).

Example 1(a)

DMSA-coated nanoparticles were prepared using a modification of the method described in Example 1.

The Fischer-Porter bottle in Example 1 was removed from the oven and allowed to cool to room temperature.

The black, magnetic precipitate was dried under vacuum after the solvent was removed, with a magnet put next to the bottle. 50 mg of the magnetic precipitate was redispersed and purified with a mixture of 5 mL chloroform and 5 mL DMSO containing 25 mg DMSA and 0.025 mL triethylamine, with the aid of magnetic separation and sonication at 65° C. The purification step was repeated twice with ethanol in replace of chloroform.

Example 2

Utilising the apparatus shown in FIG. 1, a mixture of 0.4 mmol $Fe(C_5H_5)(C_6H_7)$, 1.2 mmol (0.4 mL) oleylamine and 0.4 mL toluene was placed in a vial. The $Fe(C_5H_5)(C_6H_7)$ was dissolved in the toluene, after which the oleylamine was added. The molar ratio of iron to oleylamine was 1:3. The concentration of the iron precursor, based on the volume of toluene, was 1.0 M. The vial was placed in a Fischer-Porter bottle with 4 mL excess toluene. The bottle was degassed and filled with hydrogen to a pressure of 1 bar then sealed.

The sealed Fischer-Porter bottle was placed in an oven at 80° C. for 24 hours, after which time the temperature was increased to 110° C. for a further 72 hours. The Fischer-Porter bottle was then removed from the oven and allowed to cool to room temperature.

The resulting nanoparticles were collected after purification using a similar procedure as in Example 1. The Fischer-Porter bottle was opened and the vial was removed. About 10 mL of toluene was added. The vial was placed next to a magnet. The black precipitate was attracted to the side of the vial next to the magnet. The solution was removed without disturbing the precipitate. The precipitate was purified twice more with toluene (10 mL).

Figure 6:
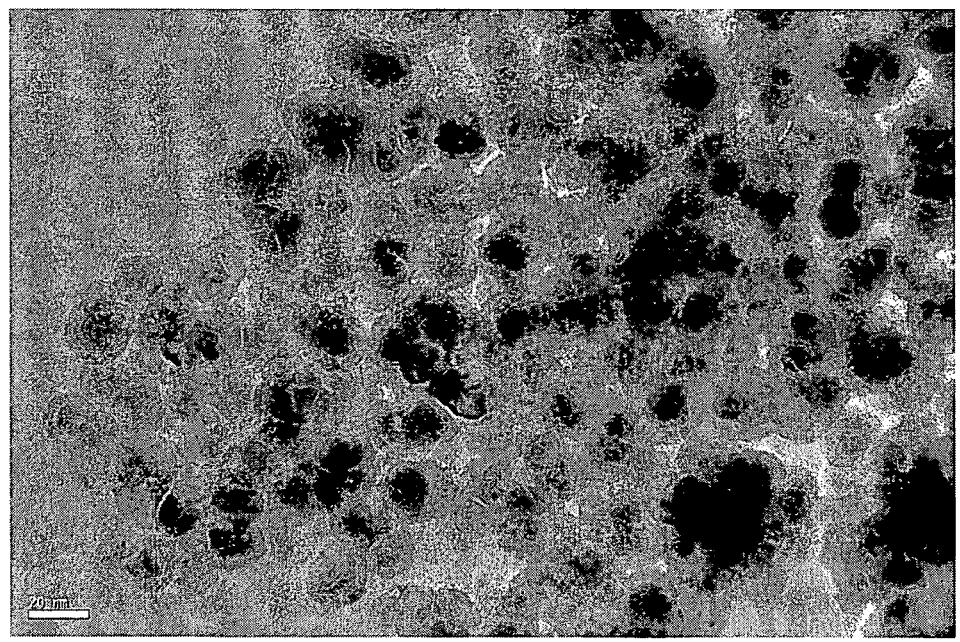
FIG. 6 is a transmission electron micrograph of iron-iron carbide/iron oxide core/shell nanoparticles.
Figure 7:
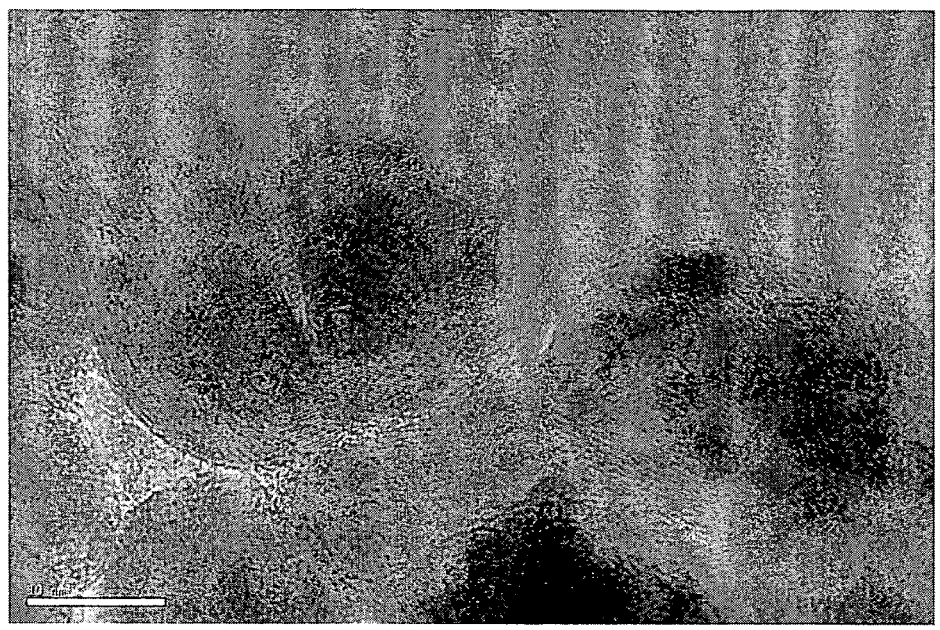
FIG. 7 is a magnification of the transmission electron micrograph of FIG. 6.
Figure 8:
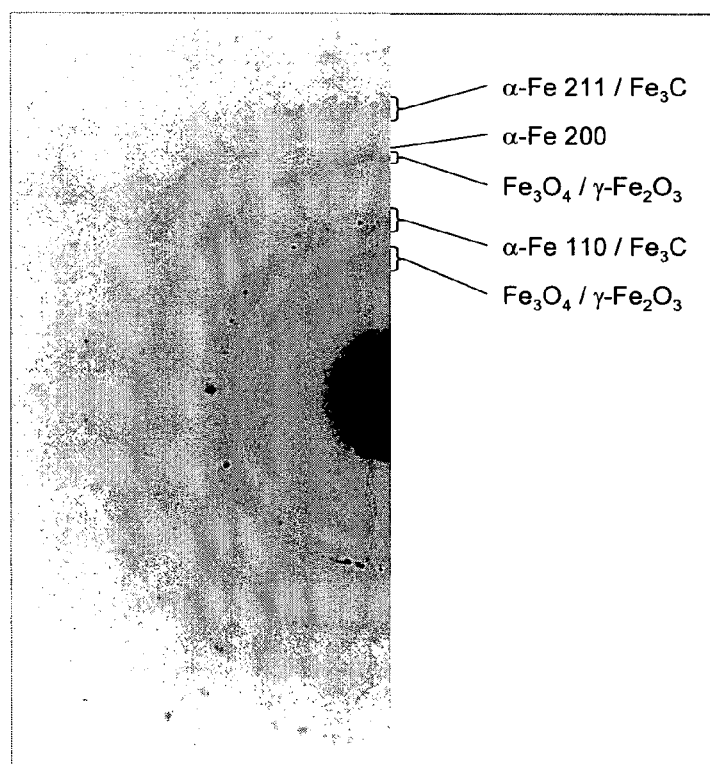
FIG. 8 is a selected area electron diffraction (SAED) pattern of the iron-iron carbide/iron oxide core/shell nanoparticles shown in FIGS. 6 and 7.

A transmission electron micrograph of the resulting nanoparticles is shown in FIG. 6. The scale bar is 20 nm. The core/shell nanoparticles were made up of two groups of particles with similar morphologies. The first group was spherical or near-spherical in shape, comprising a 14 nm (±2 nm) iron carbide ($Fe_3C$) or iron core and an iron oxide shell. The nanoparticles in the second group each comprised two near-spherical iron carbide ($Fe_3C$) cores joined at one side with an iron oxide shell, wherein each half-core was 9 nm (±2 nm). A high resolution micrograph of the nanoparticles is shown in FIG. 7. The scale bar is 10 nm. The SAED pattern of the nanoparticles is shown in FIG. 8.

These nanoparticles had a saturation magnetisation of about 100 emu/g and a coercivity of 500 Oe (≈40 kA/m) at room temperature.

Example 3

Utilising the apparatus shown in FIG. 2, 0.8 mmol $Fe(C_5H_5)(C_6H_7)$ was dissolved in a degassed mixture of 5 mL toluene and 0.8 mL oleylamine. The molar ratio of iron to oleylamine was 1:3. The concentration of the iron precursor, based on the volume of toluene, was 0.16 M.

The reaction mixture, under a nitrogen atmosphere, was heated to 80° C. and held at that temperature for 12 hrs under reflux, before being heated to 110° C. for a further 9 hours.

The resulting nanoparticles were collected after washing using the same procedure as in Example 1. The nanoparticles comprise an iron core with a partially crystalline iron oxide shell.

Figure 9:
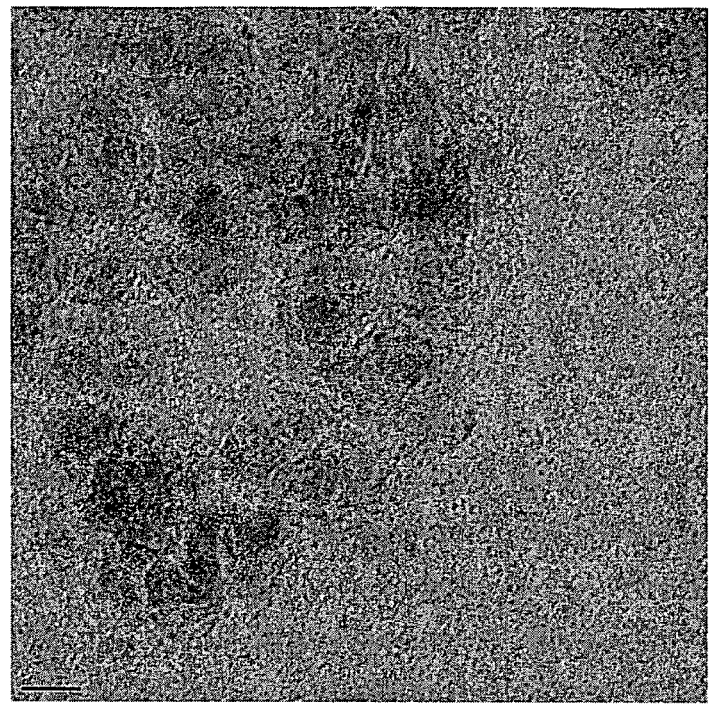
FIG. 9 is a transmission electron micrograph of iron/iron oxide core/shell nanoparticles.

A transmission electron micrograph of the resulting nanoparticles is shown in FIG. 9. The scale bar is 10 nm. The resulting nanoparticles comprised core/shell structures, with spherical or near-spherical shapes, and an iron core and an iron oxide shell. The nanoparticle size was typically 13 nm±2 nm—with a 5-7 nm core and a shell thickness of 3-4 nm.

Figure 10:
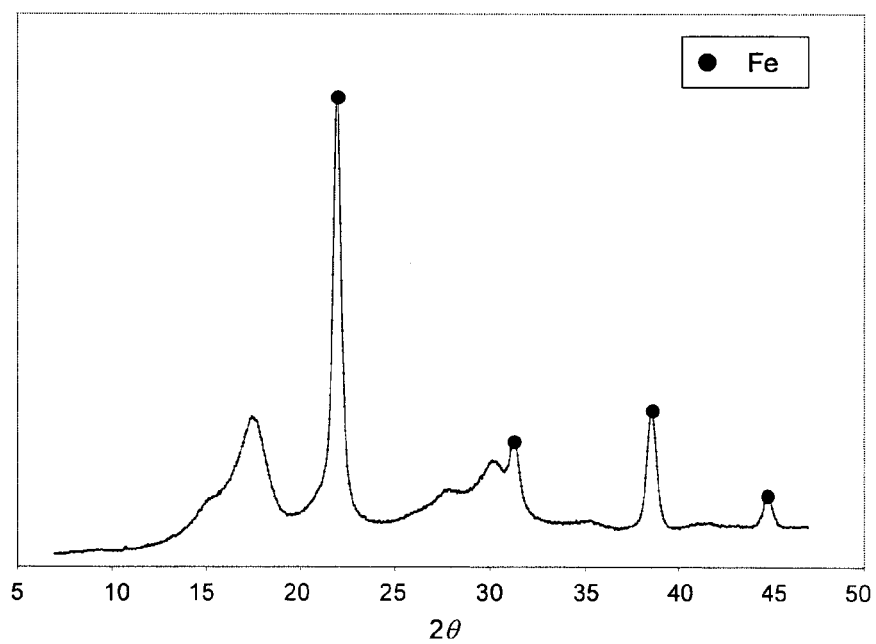
FIG. 10 is a powder X-ray diffraction pattern of the iron/iron oxide core/shell nanoparticles shown in FIG. 9.

The powder X-ray diffraction pattern of the resulting nanoparticles is shown in FIG. 10, which indicates the presence of iron (sharp peaks at 2 theta=22, 31.2, 38.5 and 44.8) and iron oxide (other broad peaks) in the sample. The iron oxide is present in the sample as the sub 5 nm nanoparticles and as the shell of the larger nanoparticles. No iron carbide was detected in the sample.

Figure 11:
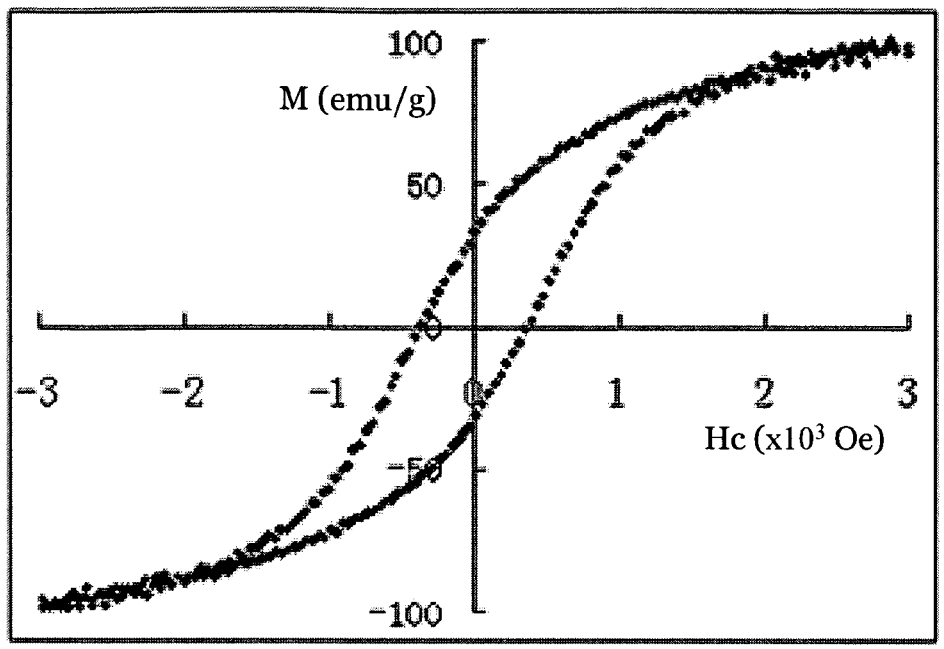
FIG. 11 is a room temperature hysteresis loop of the iron/iron oxide core/shell nanoparticles shown in FIG. 9.

FIG. 11 is the hysteresis loop of the iron/iron oxide nanoparticles at room temperature. A saturation magnetization of about 130 emu/g and coercivity of 400 Oe were obtained.

Example 4

Utilising the apparatus shown in FIG. 2, 8 mL of dichlorobenzene was degassed and heated to and maintained at 180° C. under a nitrogen atmosphere. 1.5 mmol of $Fe(C_5H_5)(C_6H_7)$ was dissolved in a separately degassed mixture of 1.2 mL dichlorobenzene and 2.5 mL of oleylamine. The mixture was injected into the heated dichlorobenzene.

The molar ratio of iron to oleylamine was 1:5. The concentration of the iron precursor, based on the total volume of dichlorobenzene, was 0.16 M. The reaction mixture, under a nitrogen atmosphere, was held at 180° C. for 2 hours under reflux.

Figure 12:
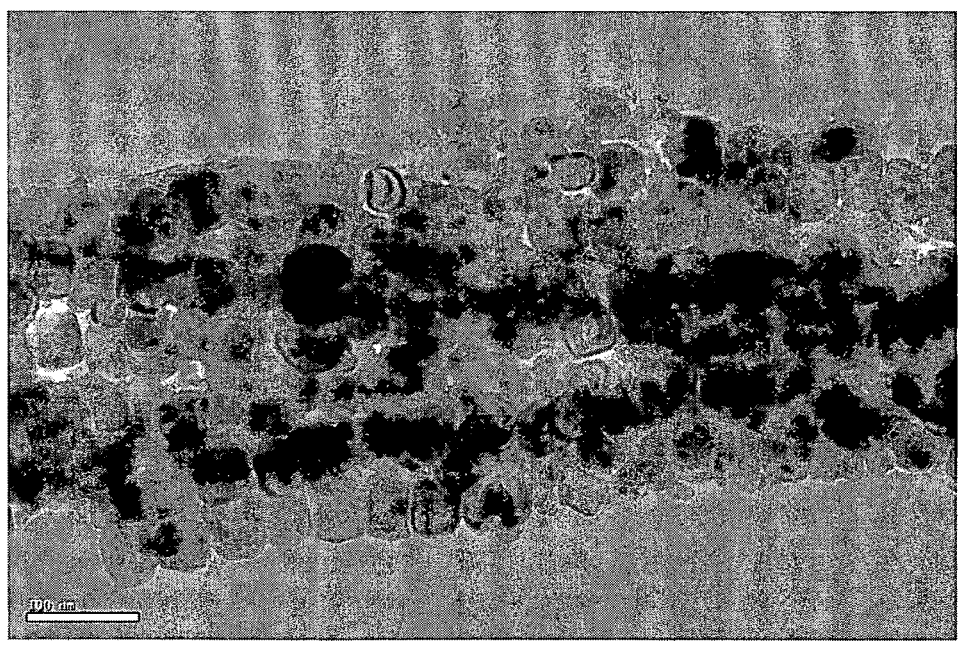
FIG. 12 is a transmission electron micrograph of iron/iron oxide core/shell nanoparticles.
Figure 13:
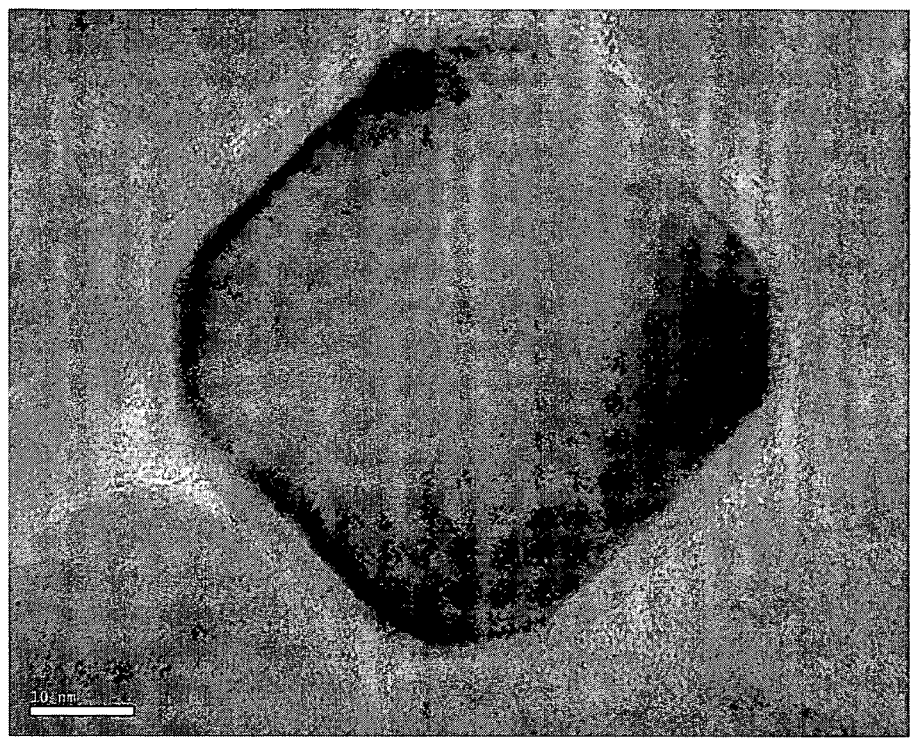
FIG. 13 is a magnification of the transmission electron micrograph of FIG. 12.

The resulting nanoparticles were collected after purification using the same procedure as in Example 1. A transmission electron micrograph of the resulting nanoparticles is shown in FIG. 12. The scale bar is 100 nm. The larger particles, with the longest cross-section measuring 62 nm±12 nm, were faceted, and comprised an iron/iron oxide core/shell structure. These particles tended to assemble into long range order. A high resolution micrograph of a typical nanoparticle is shown in FIG. 13. The scale bar is 10 nm.

There were some smaller particles, having spherical or near-spherical shapes, of 25 nm±10 nm, which comprised an iron carbide/iron oxide core/shell structure.

Repeating the procedure at larger scale produced approximately 0.1 g of magnetic nanoparticles (yield approximately 50%).

Example 5

The process of Example 2 was repeated with a mixture of 1 mmol $Fe(acac)_2$ (iron(II) acetylacetonate), 9 mmol (3 mL) oleylamine and 3 mL mesitylene, with 3 mL of excess mesitylene in the Fischer-Porter bottle. The molar ratio of iron to oleylamine was 1:9. The concentration of the iron precursor, based on the volume of mesitylene, was 0.33 M. The bottle was degassed and filled with ammonia gas.

The sealed Fischer-Porter bottle was placed in an oven at 165° C. for 1 hour, after which the temperature was decreased to 120° C. and maintained for 24 hours.

The resulting nanoparticles were collected after purification using the same procedure as in Example 1.

Figure 14:
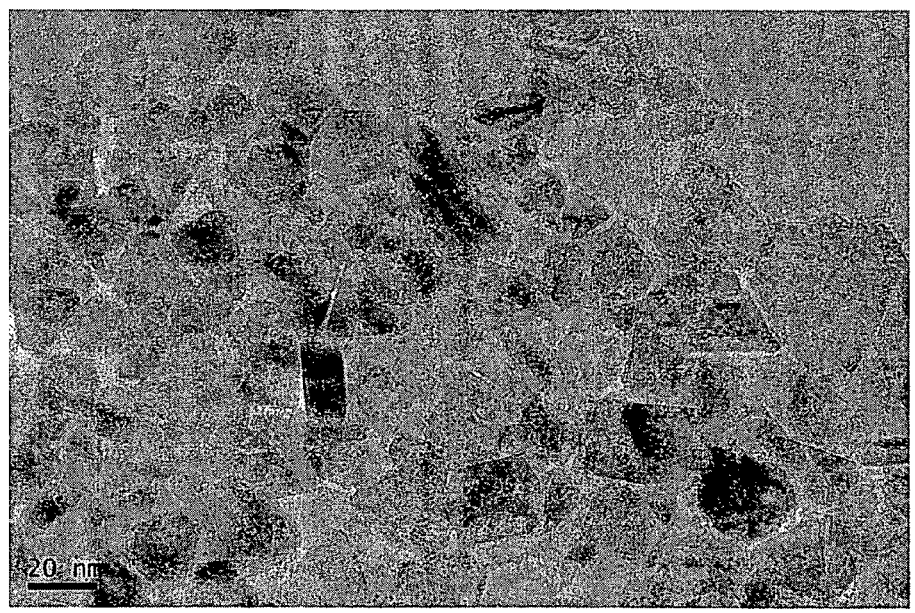
FIG. 14 is a transmission electron micrograph of iron nitride and iron oxide nanoparticles.
Figure 15:
FIG. 15 is a magnification of the transmission electron micrograph of FIG. 14.

A transmission electron micrograph of the resulting nanoparticles is shown in FIG. 14. The scale bar is 20 nm. The nanoparticles were of trigonal or hexagonal platelet morphologies, with sides of 5-25 nm, and comprised a mixture of iron nitride and iron oxide structures. A high resolution micrograph of the nanoparticles is shown in FIG. 15. The scale bar is 10 nm.

INDUSTRIAL APPLICATION

The present invention provides methods for preparing magnetic nanoparticles and nanoparticles produced by those methods. The magnetic nanoparticles may comprise metal, metal carbide, metal nitride, metal sulfide, metal phosphide, metal oxide or a mixture thereof. Advantageously, the methods of the present invention enable the production of magnetic nanoparticles having a core comprising metal, metal carbide, metal nitride, metal sulfide, metal phosphide, or a mixture thereof and a metal oxide shell, by the solution phase decomposition of a suitable precursor.

The resulting magnetic nanoparticles have a number of possible applications, as would be appreciated by a person skilled in the art. For example, the magnetic particles may be used in high-density recording media, spintronics, magnetic separation techniques, and as MRI imaging or contrast agents.

It is not the intention to limit the scope of the invention to the abovementioned examples only. As would be appreciated by a skilled person in the art, many variations are possible without departing from the scope of the invention as set out in the accompanying claims.

The invention claimed is:
1. A method for preparing magnetic nanoparticles, the method comprising:
  (a) preparing a solution of a precursor comprising at least one metal compound in a liquid reaction medium, wherein the metal compound is an organoiron compound comprising at least one ligand that is not carbon monoxide;
  (b) heating the solution in a reaction vessel under a reactive gas atmosphere to a first temperature and maintaining the first temperature for a first period of time to at least partially decompose the precursor;
  (c) optionally, heating or cooling the reaction mixture from step (b) to a second temperature and maintaining the second temperature for a second period of time to further decompose the precursor;
  (d) exposing the reaction mixture to an oxidising medium; and
  (e) recovering the resulting nanoparticles.
2. A method as claimed in claim 1, wherein the reactive gas atmosphere comprises a reducing agent.
3. A method as claimed in claim 2, wherein the reactive gas atmosphere is a hydrogen atmosphere.
4. A method as claimed in claim 3, wherein the organoiron compound is a sandwich or half sandwich compound.
5. A method as claimed in claim 4, wherein the organoiron compound is $Fe(C_5H_5)(C_6H_7)$, $Fe(C_5H_5)_2$, or a salt of $[Fe(C_5H_5)(C_6H_6)]^+$.
6. A method as claimed in claim 5, wherein the organoiron compound is $Fe(C_5H_5)(C_6H_7)$.

7. A method, as claimed in claim 3, the method comprising:
  (a) preparing a solution of a precursor comprising at least one organoiron compound, which comprises at least one ligand that is not carbon monoxide, in a liquid reaction medium;
  (b) heating the solution in a reaction vessel under a hydrogen atmosphere to a first temperature and maintaining the first temperature for a first period of time to at least partially decompose the precursor;
  (c) exposing the reaction mixture to an oxidising medium; and
  (d) recovering the resulting nanoparticles.
8. A method, as claimed in claim 3, the method comprising:
  (a) preparing a solution of a precursor comprising at least one organoiron compound, which comprises at least one ligand that is not carbon monoxide, in a liquid reaction medium;
  (b) heating the solution in a reaction vessel under a hydrogen atmosphere to a first temperature and maintaining the first temperature for a first period of time to at least partially decompose the precursor;
  (c) heating the reaction mixture from step (b) to a second temperature and maintaining the second temperature for a second period of time to further decompose the precursor;
  (d) exposing the reaction mixture to an oxidising medium; and
  (e) recovering the resulting nanoparticles.
9. A method as claimed in claim 3, wherein the nanoparticles have a core comprising iron, iron carbide, or a mixture of iron and iron carbide and a shell comprising iron oxide.
10. A method as claimed in claim 3, wherein the liquid reaction medium comprises a surfactant.
11. A method as claimed in claim 3 further comprising mixing the product nanoparticles with a ligand.
12. A method as claimed in claim 1, wherein the reactive gas atmosphere is an ammonia gas atmosphere.
13. A method as claimed in claim 12, wherein the iron compound comprises at least one polydentate ligand.
14. A method as claimed in claim 13, wherein the iron compound comprises at least one bidentate ligand.
15. A method as claimed in claim 14, wherein the iron compound is iron (II) acetylacetonate.
16. A method, as claimed in claim 12, the method comprising:
  (a) preparing a solution of a precursor comprising at least one iron compound, this comprises at least one ligand that is not carbon monoxide or bis(trimethylsilylamide), in a liquid reaction medium;
  (b) heating the solution in a reaction vessel under an ammonia atmosphere to a first temperature and maintaining the first temperature for a first period of time to at least partially decompose the precursor;
  (c) cooling the reaction mixture from step (b) to a second temperature and maintaining the second temperature for a second period of time to further decompose the precursor;
  (d) exposing the reaction mixture to an oxidising medium; and
  (e) recovering the resulting nanoparticles.
17. A method as claimed in claim 16, wherein the nanoparticles comprise iron nitride or iron oxide.
18. A method as claimed in claim 12, wherein the liquid reaction medium comprises a surfactant.
19. A method as claimed in claim 12 comprising mixing the product nanoparticles with a ligand.

* * * * *